United States Patent
Itaya

(10) Patent No.: US 9,495,020 B2
(45) Date of Patent: Nov. 15, 2016

(54) HANDWRITING INPUT SYSTEM, INPUT CONTENTS MANAGEMENT SERVER AND TANGIBLE COMPUTER-READABLE RECORDING MEDIUM

(71) Applicant: Konica Minolta, Inc., Chiyoda-ku (JP)

(72) Inventor: Shimpei Itaya, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 453 days.

(21) Appl. No.: 13/938,264

(22) Filed: Jul. 10, 2013

(65) Prior Publication Data
US 2014/0028590 A1   Jan. 30, 2014

(30) Foreign Application Priority Data
Jul. 27, 2012   (JP) .................................. 2012-167762

(51) Int. Cl.
*G06F 3/0354*   (2013.01)
*G06F 3/0488*   (2013.01)

(52) U.S. Cl.
CPC ......... *G06F 3/0354* (2013.01); *G06F 3/04883* (2013.01); *G06F 3/04886* (2013.01)

(58) Field of Classification Search
CPC ................ G06F 3/1446; G06F 3/04883; G06F 3/1423; G06F 1/1624; G06F 1/1641; G06F 3/0354; G09G 2300/026
See application file for complete search history.

(56) References Cited

U.S. PATENT DOCUMENTS 6,252,563 B1 *  6/2001  Tada ...................... G06F 3/038
                                                          178/18.01
2005/0270278 A1  12/2005  Ouchi
(Continued)

FOREIGN PATENT DOCUMENTS

JP   2005-346583 A   12/2005
JP   2010-003218 A   1/2010
(Continued)

OTHER PUBLICATIONS

Office Action (Notice of Reason for Refusal) issued on Nov. 5, 2014, by the Japan Patent Office in corresponding Japanese Patent Application No. 2012-167762, and an English Translation of the Office Action. (10 pages).
(Continued)

*Primary Examiner* — Quan-Zhen Wang
*Assistant Examiner* — Xuemei Zheng
(74) *Attorney, Agent, or Firm* — Buchanan Ingersoll & Rooney PC

(57) ABSTRACT

Disclosed is an handwriting input system including: a plurality of handwriting input devices which are adjacently arranged, each handwriting input device comprising an input surface to receive a handwriting input; and an information management unit which is connected with the handwriting input devices so as to be communicate with the handwriting input devices, wherein each of the handwriting input devices transmits draw data indicating draw contents of the handwriting input received by the input surface, to the information management unit, and the information management unit obtains relative position information of the plurality of handwriting input devices which are adjacently arranged, and joins the draw data received from the plurality of handwriting input devices so as to arrange the draw data in
(Continued)

relative positions indicated by the relative position information.

29 Claims, 20 Drawing Sheets

(56) References Cited

U.S. PATENT DOCUMENTS

| | | | |
|---|---|---|---|
| 2010/0281435 A1* | 11/2010 | Bangalore | G06F 3/04883 715/863 |
| 2012/0062442 A1 | 3/2012 | Locker et al. | |
| 2012/0162444 A1* | 6/2012 | Suda | G06F 3/03545 348/207.1 |
| 2013/0091449 A1* | 4/2013 | Tu | G06F 3/04812 715/765 |
| 2013/0214995 A1* | 8/2013 | Lewin | G06F 3/1446 345/1.3 |
| 2014/0002327 A1* | 1/2014 | Toren | G06F 3/1423 345/1.1 |

FOREIGN PATENT DOCUMENTS

| | | |
|---|---|---|
| JP | 2011-048431 A | 3/2011 |
| JP | 2011-114352 A | 6/2011 |

OTHER PUBLICATIONS

Notification of the First Office Action issued in corresponding Chinese Patent Application No. 201310311187.2; dated Dec. 2, 2015, and English translation (29 pages).

Second Office Action dated Jul. 29, 2016 issued by the State Intellectual Property Office of the People's Republic of China in corresponding Chinese Patent Application No. 201310311187.2, and English language translation of Office Action (28 pages).

* cited by examiner

PREPARE DIVISION IMAGES

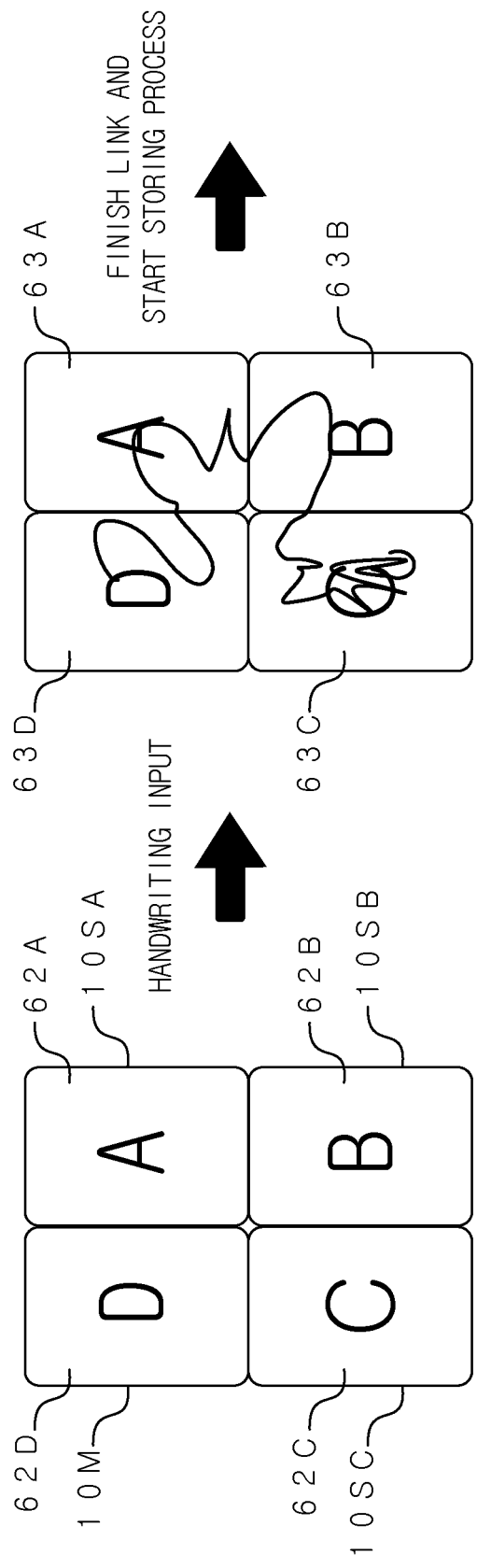

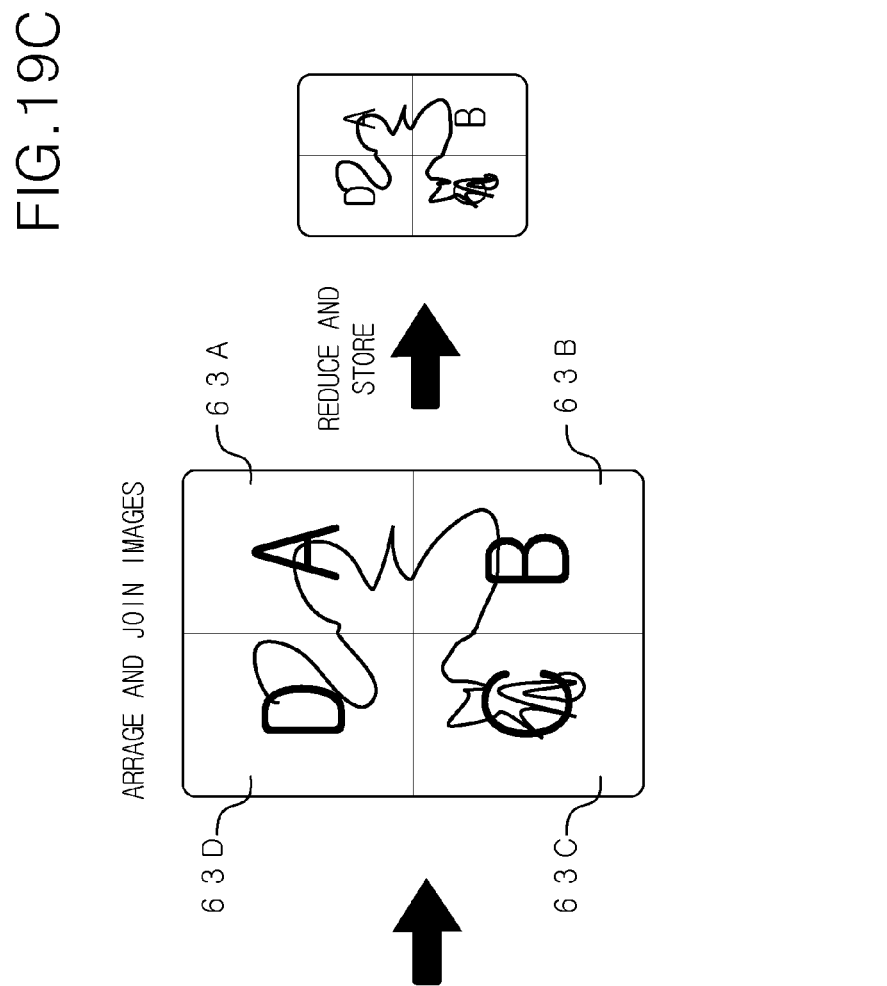

HANDWRITING INPUT SYSTEM, INPUT CONTENTS MANAGEMENT SERVER AND TANGIBLE COMPUTER-READABLE RECORDING MEDIUM

BACKGROUND OF THE INVENTION

1. Field of the Invention

The present invention relates to a handwriting input system, an input contents management server and a tangible computer-readable recording medium which manage the information relating to the handwriting input received by each of a plurality of handwriting input devices.

2. Description of Related Art

A technology in which a plurality of display devices, such as electronic papers, are arranged and one image is displayed so as to enlarge the image by using displays of the display devices, has been proposed (See Japanese Patent Application Publication No. 2011-48431). In this method, by linking the display contents of a plurality of display devices, it is possible to expand the display area and display one image largely (See FIG. 7).

Further, a technology in which when the display contents displayed by a plurality of display devices are linked, one of the display devices controls the whole display contents displayed in a plurality of linked display devices, has been proposed (See Japanese Patent Application Publication No. 2011-114352).

Instead of the display devices, it is considered that a plurality of handwriting input devices, such as pen tablets, are arranged and a large handwriting input surface is formed to use the handwriting input surface at a conference or the like. In this case, when the contents of the handwriting input (additional description, correction or the like) received by each handwriting input device are maintained in each handwriting input device, for example, the contents of the handwriting input cannot be managed as one data (for example, one image data). Therefore, it is inconvenient to display the contents by using another device or to print out the contents.

SUMMARY

To achieve at least one of the abovementioned objects, a handwriting input system reflecting one aspect of the present invention, comprises:

a plurality of handwriting input devices which are adjacently arranged, each handwriting input device comprising an input surface to receive a handwriting input; and an information management unit which is connected with the handwriting input devices so as to be communicate with the handwriting input devices, wherein each of the handwriting input devices transmits draw data indicating draw contents of the handwriting input received by the input surface, to the information management unit, and the information management unit obtains relative position information of the plurality of handwriting input devices which are adjacently arranged, and joins the draw data received from the plurality of handwriting input devices so as to arrange the draw data in relative positions indicated by the relative position information.

Preferably, each of the handwriting input devices further comprises a display unit in which the input surface is formed on a display surface to display an image, the information management unit transmits division images obtained by dividing an original image into the number of the handwriting input devices in accordance with the relative position information, to the handwriting input devices arranged in same relative positions as the division images of the original image, respectively, and each of the handwriting input devices displays the division image received from the information management unit, on the display unit, and receives the handwriting input by the input surface.

Preferably, the information management unit reduces the joined draw data so as to match with a size of the original image, and stores the reduced draw data so as to relate the reduced draw data to the original image.

Preferably, the original image is a white image or an image indicating blank data.

Preferably, each of the handwriting input devices further comprises a display unit in which the input surface is formed on a display surface to display an image, each of the handwriting input devices displays an own image held by each handwriting input device on the display unit, receives the handwriting input by the input surface and transmits the own image and the draw data to the information management unit by overlapping the own image and the draw data or by separating the draw data from the own image, and the information management unit joins the own images and the draw data received from the plurality of handwriting input devices by overlapping the own image and the draw data or by separating the draw data from the own image, so as to arrange the own images and the draw data in the relative positions indicated by the relative position information.

Preferably, the information management unit reduces data contents obtained by joining the own images and the draw data, to a size in which the data contents are displayed by one handwriting input device, and store the reduced data contents.

Preferably, every when each of the handwriting input devices receives one stroke of the handwriting input by the input surface, the handwriting input device which receives the one stroke of the handwriting input transmits the draw data indicating the draw contents of the handwriting input, to the information management unit, in case that the draw data received from one of the handwriting input devices, which includes a first updated one stroke of the handwriting input and the draw data received from another of the handwriting input devices, which includes a second updated one stroke of the handwriting input have a time continuity, the information management unit groups the first updated one stroke of the handwriting input and the second updated one stroke of the handwriting input into a continuous stroke, and the information management unit treats the continuous stroke as a stroke to be cancelled by carrying out a return operation once.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 18A and 18B are explanatory views showing the situation in which the handwriting input is received by a plurality of linked electronic papers in Example 3;

FIGS. 19A to 19C are explanatory views showing the situation in which the image displayed by each electronic paper is stored after the situation shown in FIG. 18B.

DETAILED DESCRIPTION OF PREFERRED EMBODIMENTS

Hereinafter, a preferred embodiment of the present invention will be explained with reference to the accompanying drawings.

Figure 1:
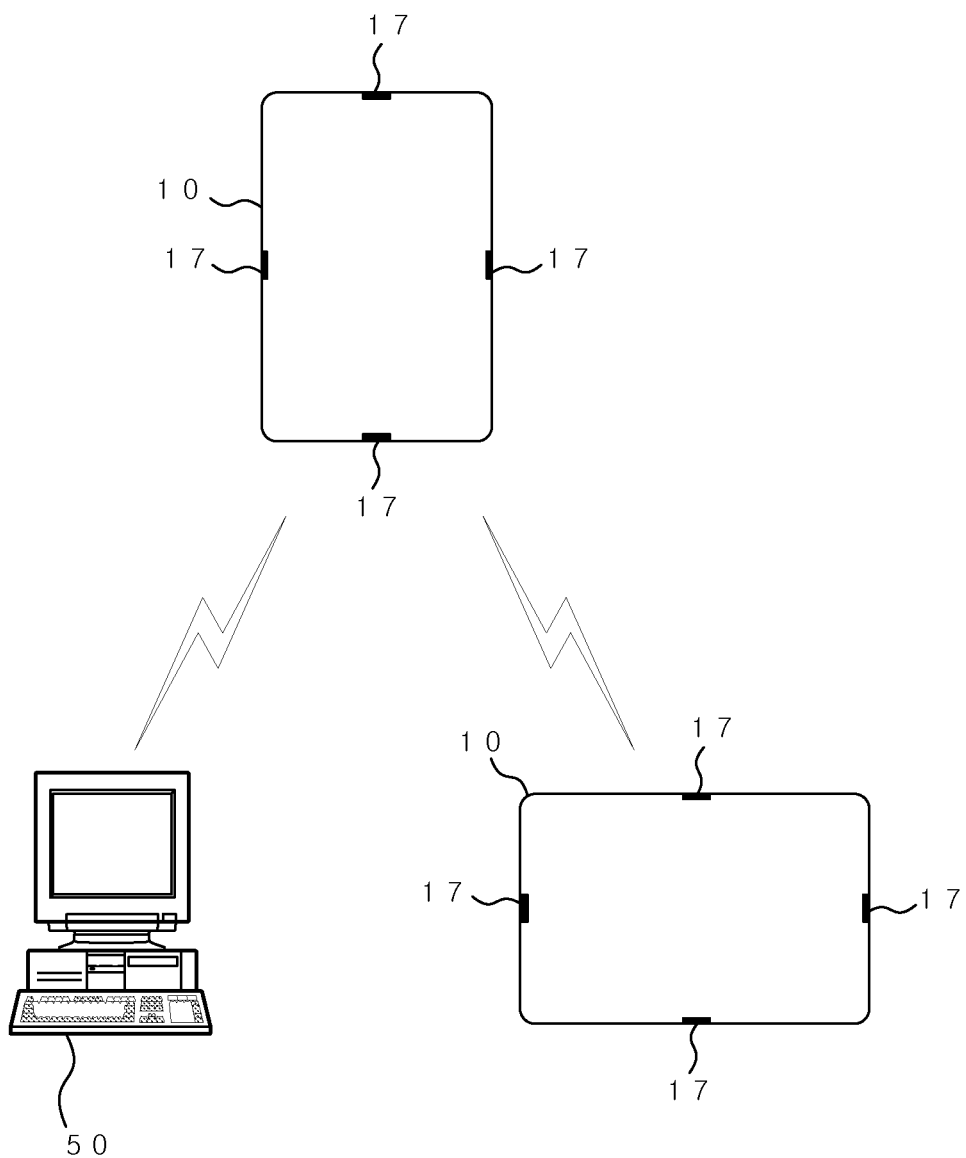
FIG. 1 is an explanatory view showing the method of using the electronic papers according to the embodiment.

FIG. 1 shows a plurality of electronic papers 10 each of which has the function of the handwriting input device, and an external terminal 50. Each electronic paper 10 and the external terminal 50 are connected via a network, such as LAN (Local Area Network) or the like.

The electronic paper 10 is a portable terminal which is formed in a rectangular plate shape having approximately 35 size (182 mm×257 mm). The electronic paper 10 is a so-called operation display device comprising an operation panel 30 (See FIG. 2) having a display unit 31 and an operating unit 32. The electronic paper 10 displays an image received from another electronic paper 10 or the external terminal 50, and its own image on the display unit 31. Then, a user can carry out the handwriting input, such as additional description, correction or the like, for the window displayed on the display unit 31, by using the operation panel 30.

The electronic papers 10 according to the embodiment can expand the display area and the operating area by arranging a plurality of electronic papers 10 so as to be adjacent to each other and linking the operation contents and the display contents via a wireless communication. Therefore, it is possible to improve the visibility and the operability. For example, by linking the display contents of the display units 31 of a plurality of electronic papers 10, it is possible to largely display one image by a plurality of electronic papers 10 which are arranged so as to be adjacent to each other (which are adjacently arranged) (See FIG. 7).

The external terminal 50 is a so-called PC (Personal Computer) terminal having the function of transmitting display data of an image to be displayed on the display unit 31 of the electronic paper 10. The electronic paper 10 has the function of displaying a document or the like received from the external terminal 50, receiving the handwriting input for the document and transmitting the contents of the document and the contents of the handwriting input to the external terminal 50 so as to relate them to each other. For example, the electronic paper 10 is used for correcting the document prepared by the external terminal 50 in handwriting.

Figure 2:
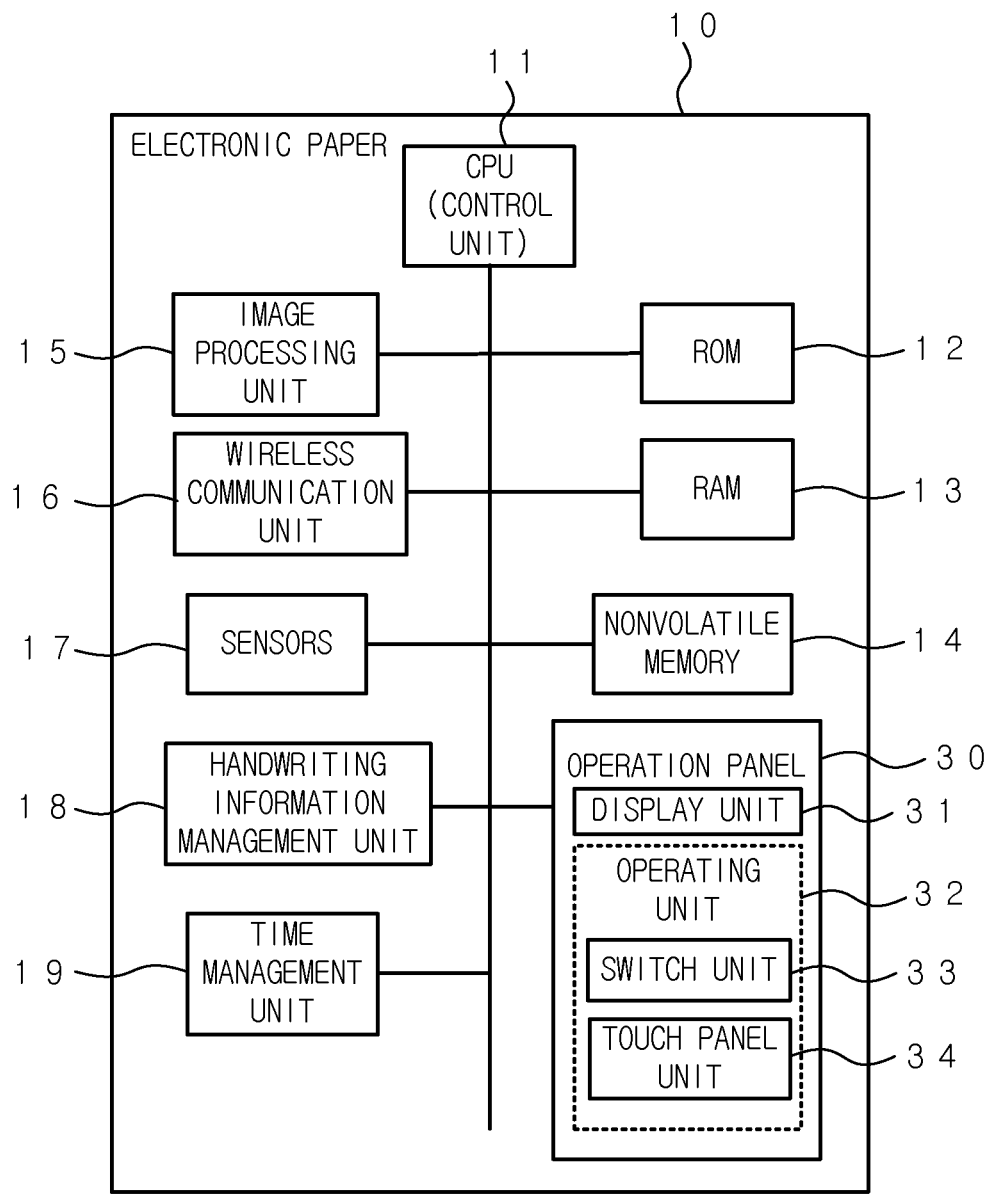
FIG. 2 is a block diagram showing the schematic configuration of the electronic paper according to the embodiment.

FIG. 2 is a block diagram showing the schematic configuration of the electronic paper 10 according to the embodiment. The electronic paper 10 comprises a CPU (Central Processing Unit) 11 as a control unit for controlling the entire operation of the electronic paper 10. The CPU 11 is connected with a ROM (Read Only Memory) 12, a RAM (Random Access Memory) 13, a nonvolatile memory 14, an image processing unit 15, a wireless communication unit 16, sensors 17, a handwriting information management unit 18, a time management unit 19 and the operation panel 30 via a bus.

In the ROM 12, various types of programs are stored in addition to a starting program. By loading the program stored in the ROM 12 to the RAM 13 and executing various processes in accordance with the program by the CPU 11, each function of the electronic paper 10 is realized. Further, in the ROM 12, the program for executing a series of the control of the electronic paper 10 by the CPU 11, is stored.

The RAM 13 is used as a load area of the program, and a work area for temporarily storing various data when the CPU 11 executes the program.

The nonvolatile memory 14 is a memory (flash memory) in which the stored contents are not damaged even if the electronic paper 10 is turned off. The nonvolatile memory 14 is used for storing various types of setting contents and the like. In this embodiment, the display data relating to an image, the draw data indicating the draw contents of the handwriting input and the like are stored. The display data and the draw data are managed by storing them in the different layers, respectively. The layer in which the display data is stored is referred to as the image layer. The layer in which the draw data is stored is referred to as the handwriting layer. The image layer and the handwriting layer are overlapped (are synthesized on a video memory) to display the above data on the display unit 31.

The image processing unit 15 prepares the image to be displayed on the display unit 31 (overlapped image 70 (See FIG. 9) obtained by overlapping the image layer and the handwriting layer), from the display data and the draw data which are stored in the RAM 13. Further, the image processing unit 15 carries out the processings, such as separation, join, compression, decompression of an image and the like, in addition to the processings, such as enlargement, reduction, rotation of an image, and the like.

The wireless communication unit 16 has the function of communicating data with another electronic paper 10 or the external terminal 50 via a network, such as LAN.

The sensors 17 are provided at four portions which are on the upper side surface, the lower side surface, the right side surface and the left side surface of the electronic paper 10, respectively. Each sensor 17 judges whether another electronic paper 10 is adjacently arranged. Each sensor 17 is provided so as to face to the sensor 17 of the adjacent electronic paper 10 when a plurality of electronic papers 10 are adjacently arranged.

For example, each sensor 17 can communicate with only another sensor 17 which is disposed within ±15 degrees from the direction in which the sensor 17 faces. In this embodiment, the sensor 17 has an extremely short communication range, and cannot communicate with another electronic paper 10 unless the sensor 17 is disposed so as to contact with another sensor 17. When the sensor 17 can communicate with the sensor 17 of another electronic paper 10, the CPU 11 judges that another electronic paper 10 is adjacently arranged in the direction in which the sensor 17 faces (See FIG. 4). The above method for detecting whether another electronic paper 10 is adjacently arranged is one example. In order to detect whether another electronic paper 10 is adjacently arranged, another sensor or another method may be used.

The operating unit 30 comprises the display unit 31 and the operating unit 32. The operating unit 32 comprises a switch unit 33 having a start button and the like, and a touch panel unit 34. The display unit 31 is constructed by a particle migration type of electronic paper, and has the function of displaying an image in accordance with the instruction of the CPU 11. The display unit 31 can also carry out the color display by using a color filter. In the display unit 31, the pixels are arranged in a matrix form in a plane. The display unit 31 is a so-called dot-matrix type of display device.

In this embodiment, the CPU 11 carries out the control of the display contents (image) to be displayed by the operation panel 30 and the control relating to the reception of the operation for the operation panel 30.

The touch panel 34 is provided on the display unit 31. The touch panel unit 34 detects the touch position (coordinate position) of the display unit 31, on which a user pushes with a touch pen, his/her finger or the like. That is, the touch panel unit 34 functions as an input surface for receiving the handwriting input. The CPU 11 recognizes the handwriting input, such as additional description, correction or the like carried out by a user, in accordance with the change in the touch position which is continuously detected (operation information).

The handwriting information management unit 18 prepares the draw data indicating the draw contents of the handwriting input, in accordance with the handwriting input from the touch panel unit 34. The draw data is prepared in the handwriting layer used for only the draw data.

The time management unit 19 manages the information relating to the time at which the electronic paper 10 carries out the predetermined process. For example, when the draw data is prepared, the time management unit 19 attaches the information relating to the time at which the handwriting input corresponding to the prepared draw data is received, to the prepared draw data.

Figure 3:
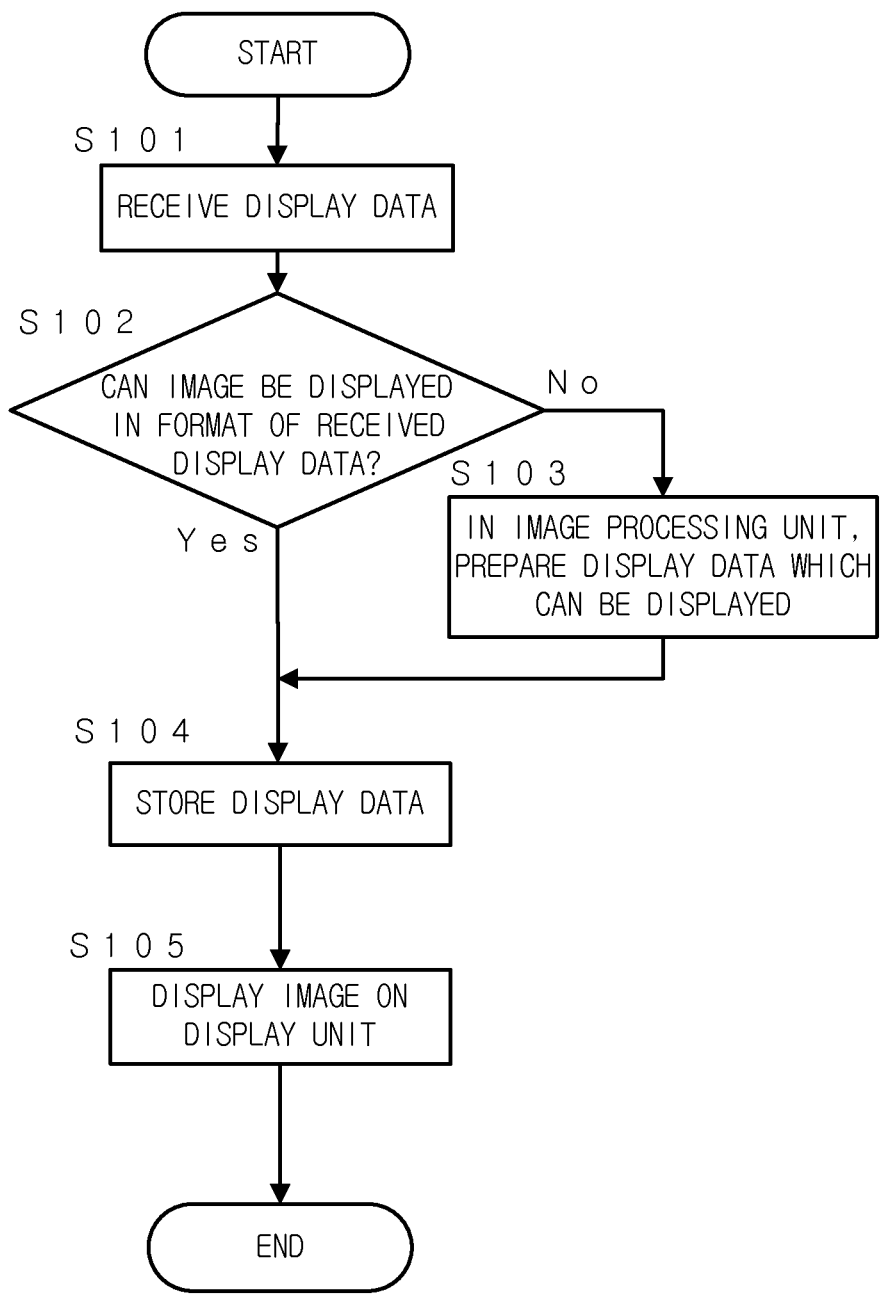
FIG. 3 is a flowchart showing the process in which the electronic paper displays an image in accordance with the display data received from an external device.

Firstly, the operation in which one electronic paper 10 displays an image alone is explained. The above operation mode is referred to as the single mode. FIG. 3 shows the process in which the electronic paper 10 which operates in the single mode displays an image on the display unit 31 in accordance with the display data received from the external terminal 50.

The electronic paper 10 receives the display data from the external terminal 50 (Step S101). When the image can be displayed in the format of the received display data (Step S102; Yes), the display data is stored without converting the display data (Step S104).

When the image cannot be displayed in the format of the received display data (Step S102; No), the image processing unit 15 converts the received display data into the display data having the displayable format (Step S103). Then, the converted display data is stored (Step S104). In this embodiment, for example, when the display data received in Step S101 is a display data having a format in which the received display data cannot be displayed as an image without converting the data, such as a document file having the character codes and the form data, the image processing unit 15 converts the received display data into the data (image data) which can be displayed as an image like a PDF (Portable Document Format) file and the like.

The CPU 11 instructs the display unit 31 to display an image in accordance with the display data stored in Step S104 (Step S105). Then, the process is ended.

Next, the case in which an image is displayed by linking a plurality of electronic papers 10, will be explained by showing the following Examples.

EXAMPLE 1

In this embodiment, when the operation contents and the display contents of a plurality of electronic papers 10 are linked, one of the electronic papers 10 is a master device (referred to as the electronic paper 10M) and the electronic paper 10M which is the master device transmits the instructions or the like to the other electronic papers 10. In this case, the electronic paper 10 which receives the instructions or the like from the electronic paper 10M (master device) is referred to as the slave device. Further, the operation mode of the electronic paper 10 which is linked with another electronic paper 10, is referred to as the link mode.

Firstly, the process for starting the link mode is explained.

Figure 4:
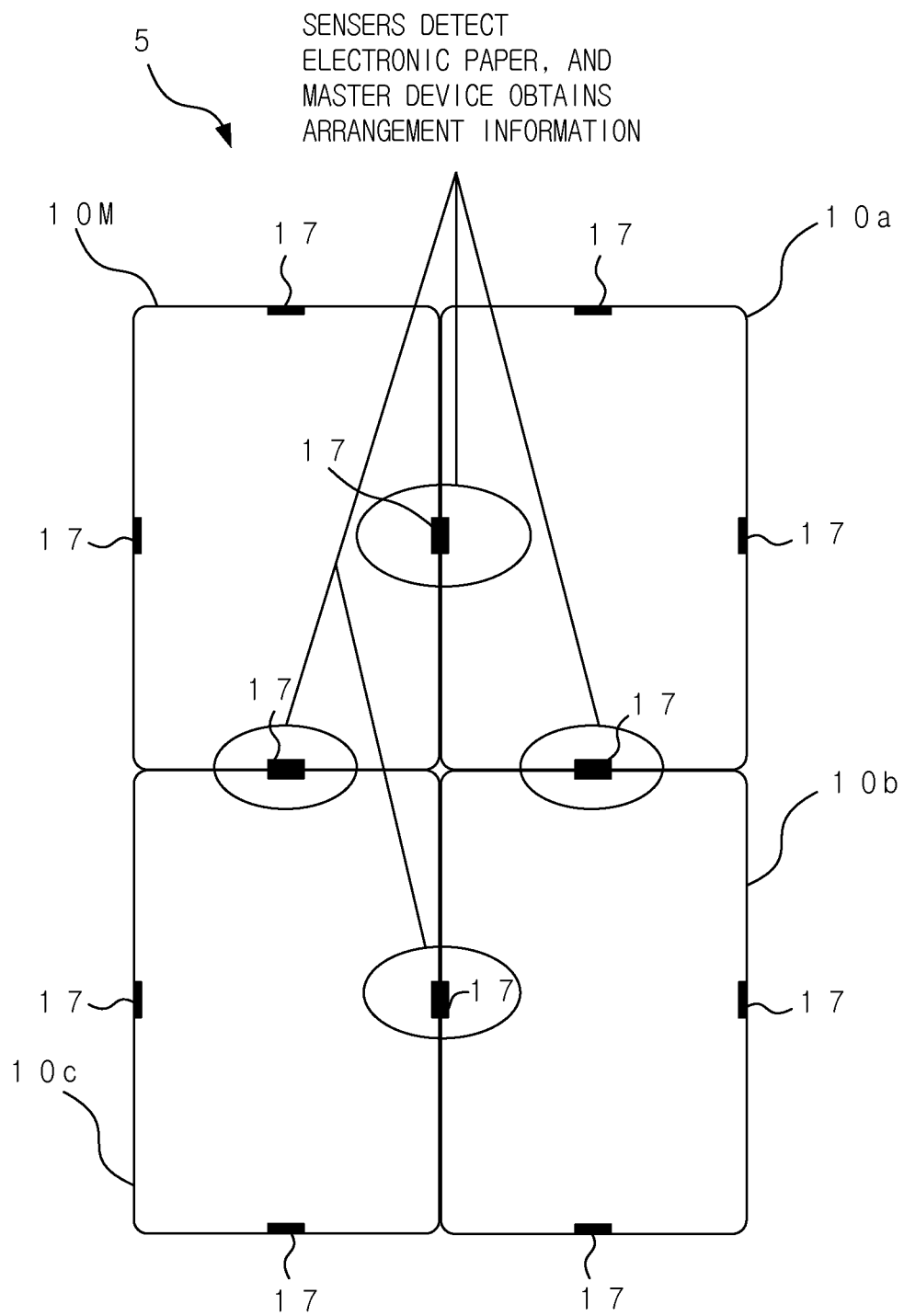
FIG. 4 is an explanatory view showing the situation in which when the electronic papers constituting the handwriting input system are linked in the link mode, the handwriting input system recognizes the arrangement position of each electronic paper.

A user arranges (adjacently arranges) a plurality of electronic papers 10 as shown in FIG. 4. Then, the user selects one electronic paper 10 as the electronic paper 10M (master device), and carries out the link mode starting operation for the selected electronic paper 10M (master device). The electronic paper 10M (master device) which receives the link mode starting operation checks the communication status and the arrangement position of each of the other electronic papers 10. Then, the electronic paper 10M (master device) establishes the communication with the communicable electronic papers 10 and starts the link mode. In this embodiment, when a plurality of electronic papers 10 are adjacently arranged, the electronic papers 10 are arranged so as to close a gap between two adjacent electronic papers 10 without shifting the electronic papers 10.

FIG. 4 shows the handwriting input system 5 configured by adjacently arranging a plurality of electronic papers 10. In Example 1, the handwriting input system 5 is configured by arranging four electronic papers 10 in 2×2 matrix form.

In FIG. 4, the user selects the electronic paper 10 which is arranged at the upper left of the handwriting input system 5, as the electronic paper 10M (master device). The electronic paper 10M (master device) confirms the communication status of the circumjacent electronic papers 10a, 10b and 10c by the wireless communication unit 16. Then, among the electronic papers 10 which can communicate with the electronic paper 10M by the wireless communication unit 16, the relative positions of the electronic papers 10a, 10b and 10c which are arranged so as to be adjacent to the electronic paper 10M (master device) (which can be used as the slave devices) are grasped. Each electronic paper 10 recognizes that another electronic paper 10 is adjacently arranged in the direction in which the communicable sensor 17 faces.

In FIG. 4, because the sensors 17 which are provided on the lower side surface and the right side surface of the electronic paper 10M (master device), respectively, can communicate with other electronic papers 10, the electronic paper 10M (master device) judges that other electronic papers 10c and 10a are arranged adjacently to the electronic paper 10M on the lower side and the right side of the electronic paper 10M, respectively.

Next, the electronic paper 10c which is adjacently arranged on the lower side of the electronic paper 10M (master device), judges that the electronic paper 10M (master device) and the electronic paper 10b are arranged adjacently to the electronic paper 10c on the upper side and the right side of the electronic paper 10c, respectively, because the sensors 17 which are provided on the upper side surface and the right side surface of the electronic paper 10c can communicate with the electronic paper 10M (master device) and the electronic paper 10b, respectively. Then, the electronic paper 10c transmits the above judgment (arrangement information) to the electronic paper 10M (master device). Further, the electronic paper 10a which is arranged on the right side of the electronic paper 10M (master device), judges that the electronic paper 10M and the electronic paper 10b are arranged adjacently to the electronic paper 10a on the left side and the lower side of the electronic paper 10a, respectively, because the sensors 17 which are provided on the left side surface and the lower side surface of the electronic paper 10a can communicate with the electronic paper 10M (master device) and the electronic paper 10b, respectively. Then, the electronic paper 10a transmits the above judgment (arrangement information) to the electronic paper 10M (master device). The electronic paper 10b which is arranged at the lower right of the electronic paper 10M (master device), judges that the electronic paper 10a and the electronic paper 10c are arranged adjacently to the electronic paper 10b on the upper side and the left side of the electronic paper 10b, respectively, because the sensors 17 which are provided on the upper side surface and the left side surface of the electronic paper 10b can communicate with the electronic paper 10a and the electronic paper 10c, respectively. Then, the electronic paper 10b transmits the above judgment (arrangement information) to the electronic paper 10M (master device). That is, the electronic paper 10M (master device) which functions as the information management unit which is (directly or indirectly) connected with the electronic papers 10a, 10b and 10c so as to communicate with each other, obtains the relative position information of the electronic papers 10M, 10a, 10b and 10c which are adjacently arranged.

The electronic paper 10M (master device) which receives the above arrangement information recognizes the number of the electronic papers 10 which are adjacently arranged and the arrangement of the electronic papers 10, in accordance with the arrangement information judged by the electronic paper 10M and the arrangement information received from the other electronic papers 10. In this example, the electronic paper 10M (master device) recognizes that the electronic papers 10c, 10a and 10b are arranged adjacently to the electronic paper 10M on the lower side and the right side and at the lower right of the electronic paper 10M.

When the sensor 17 communicates with the sensor 17 of another electronic paper 10, each electronic paper 10 transmits and receives the individual identification information of the electronic paper 10. Each electronic paper 10 specifies another electronic paper 10 which is adjacently arranged, in accordance with the individual identification information received from the electronic paper 10 which is adjacently arranged. Each slave device transmits the arrangement information including its own individual identification information, the direction in which another electronic paper 10 is arranged adjacently and the individual identification information of the electronic paper 10 which is adjacently arranged, to the electronic paper 10M (master device). The electronic paper 10M (master device) specifies the arrangement (relative position) of each electronic paper 10 which is adjacently arranged so as to form one large display area with the electronic paper 10M, in accordance with the individual identification information included in the received arrangement information.

The electronic paper 10M (master device) does not link with another electronic paper 10 which is not adjacently arranged so as to form one large display area with the electronic paper 10M, even though the electronic paper 10M can communicate with the above electronic paper 10 by the wireless communication unit 16. For example, it is assumed that there is another electronic paper 10 (not shown in the drawings) which is disposed apart from four electronic papers 10M (master device), 10a, 10b and 10c, in addition to the above four electronic papers which form one large display area as shown in FIG. 4, and that the electronic paper 10M (master device) can communicate with the above electronic paper 10 by the wireless communication unit 16. In this case, although the electronic paper 10M (master device) receives the arrangement information from the above electronic paper 10 which is disposed apart from the electronic paper 10M, it is recognized that the above electronic paper 10 is not adjacently arranged so as to form one large display area with the electronic paper 10M (master device) in accordance with the received arrangement information. Therefore, the above electronic paper 10 is not included in the linked electronic papers.

Figure 5:
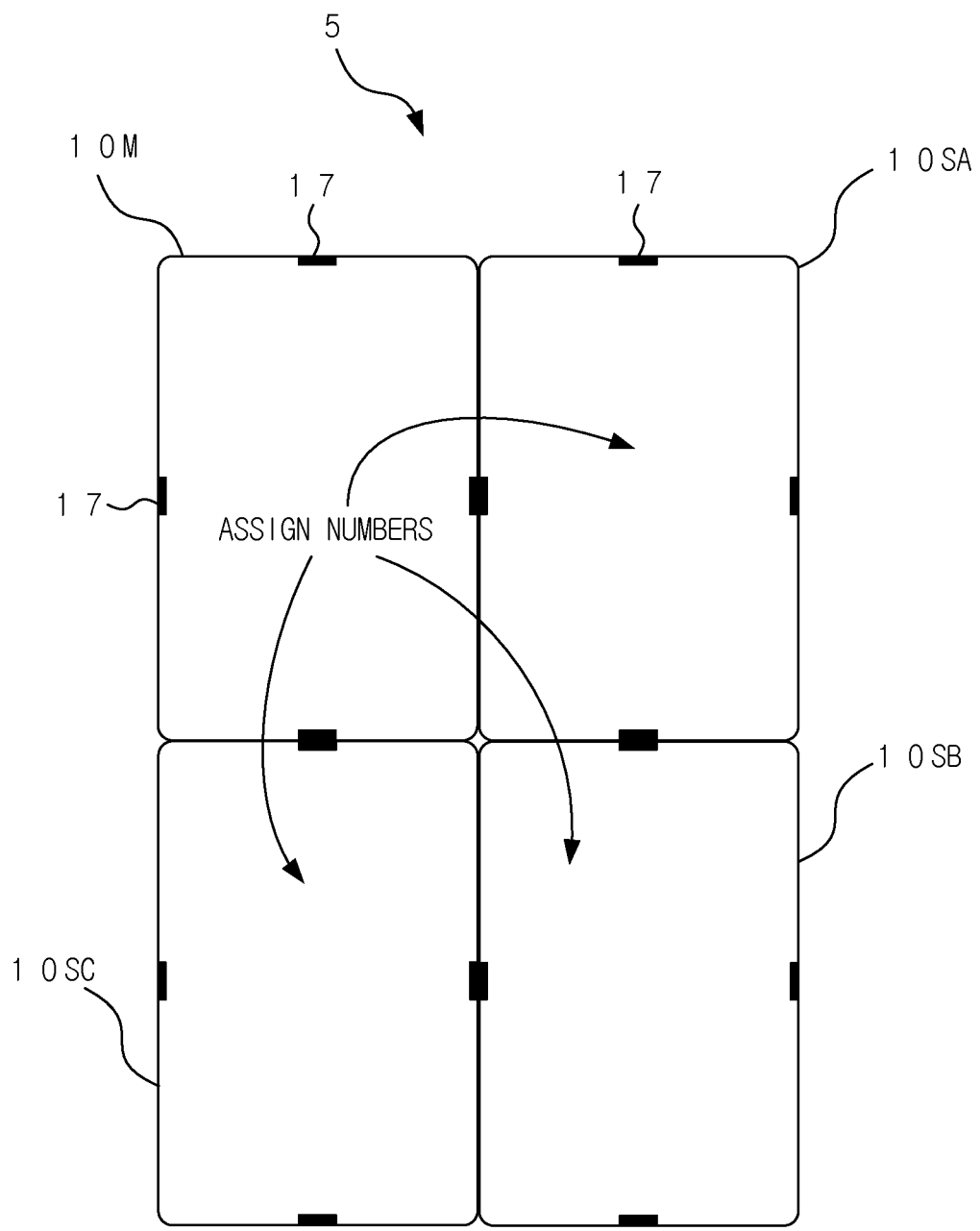
FIG. 5 is an explanatory view showing the situation in which when the electronic papers constituting the handwriting input system are linked in the link mode, the electronic paper 10M (master device) assigns the identification number to each of the other electronic papers which are slave devices.

FIG. 5 shows the situation in which the electronic paper 10M (master device) assigns the identification number to each of the electronic papers 10 which are the slave devices after the electronic paper 10M (master device) recognizes the arrangement position of each linked electronic paper 10 in the handwriting input system 5. In FIG. 5, the identification number "SA (Slave A)" is assigned to the electronic paper 10 which is adjacent to the right side of the electronic paper 10M (master device). The identification number "SB (Slave B)" is assigned to the electronic paper 10 which is adjacent at the lower right of the electronic paper 10M (master device). The identification number "SC (Slave C)" is assigned to the electronic paper 10 which is adjacent to the lower side of the electronic paper 10M (master device).

Next, the process for largely displaying one image (original image) by using all of the display units 31 of four linked electronic papers 10 (referred to as "all screen display", is explained. Firstly, the electronic paper 10M (master device) divides the image to be displayed by the all screen display among the display data stored in the electronic paper 10M, into the number of the linked electronic papers 10.

Figure 6A:
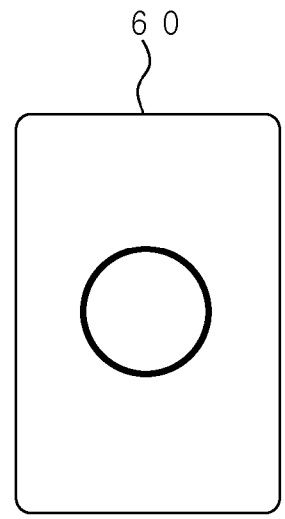
FIGS. 6A and 6B are explanatory views showing the situation in which an image for carrying out the all screen display by using a plurality of linked electronic papers, is prepared.
Figure 6B:
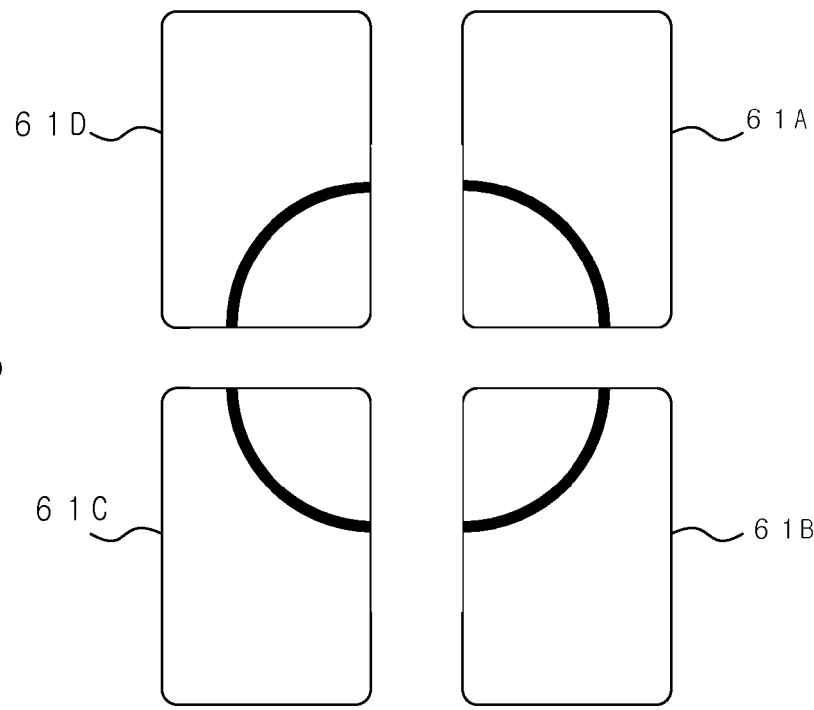

FIGS. 6A and 6B show the situation in which the image processing unit 15 of the electronic paper 10M (master device) divides the original image 60 (See FIG. 6A) which is selected as the image to be displayed, into four division images. When the original image 60 is divided, the original image is divided into division images which have the shape corresponding to the arrangement of four electronic papers 10 which are linked in the link mode. For example, in case that the electronic papers 10 are arranged in 2×2 matrix form as shown in FIG. 5, the original image is divided into the division images so as to form 2×2 matrix (See FIG. 6B). Among the division images obtained by dividing the original image, the division image corresponding to the upper right part of the original image 60 is the division image 61A. The division image corresponding to the lower right part of the original image 60 is the division image 61B. The division image corresponding to the lower left part of the original image 60 is the division image 61C. The division image corresponding to the upper left part of the original image 60 is the division image 61D.

Then, the electronic paper 10M enlarges each division image 61A to 61D to the size in which each division image can be displayed by one electronic paper 10. The electronic paper 10M transmits four display data obtained by enlarging the division images, to the different slave devices, respectively. Each display data is transmitted to the electronic paper 10 which is arranged in the same relative position as the corresponding part of the original image 60. For example, the display data corresponding to the upper right part of the original image 60 is transmitted to the electronic paper 10SA which is arranged in the upper right part of the handwriting input system 5.

In this case, the display data (display data obtained by enlarging the division image 61A) corresponding to the upper right part of the original image 60 is transmitted to the electronic paper 10SA arranged in the upper right part of the handwriting input system 5 among the linked electronic papers 10. The display data (display data obtained by enlarging the division image 61B) corresponding to the lower right part of the original image 60 is transmitted to the electronic paper 10SB arranged in the lower right part of the handwriting input system 5 among the linked electronic papers 10. The display data (display data obtained by enlarging the division image 61C) corresponding to the lower left part of the original image 60 is transmitted to the electronic paper 10SC arranged in the lower left part of the handwriting input system 5 among the linked electronic papers 10. The display data (display data obtained by enlarging the division image 61D) corresponding to the upper left part of the original image 60 is held by the electronic paper 10M (master device) arranged in the upper left part of the handwriting input system 5 among the linked electronic papers 10.

That is, the electronic paper 10M (master device) which functions as the information management unit, transmits the division images 61A, 61B, 61C and 61D obtained by dividing the original image 60 into the number (in this example, 4) of the electronic papers which are adjacently arranged, in accordance with the relative position information of each electronic paper 10, to the electronic papers 10 as the handwriting input devices, which are arranged in the same relative positions as the division images 61A, 61B, 61C and 61D of the original image 60, respectively. In case that the destination of the division image is the electronic paper 10M which functions as the information management unit and the handwriting input device, transmitting the division image 61 to the electronic paper 10 is that the electronic paper 10M prepares the corresponding division image 61 (in this example, division image 61D).

Figure 7:
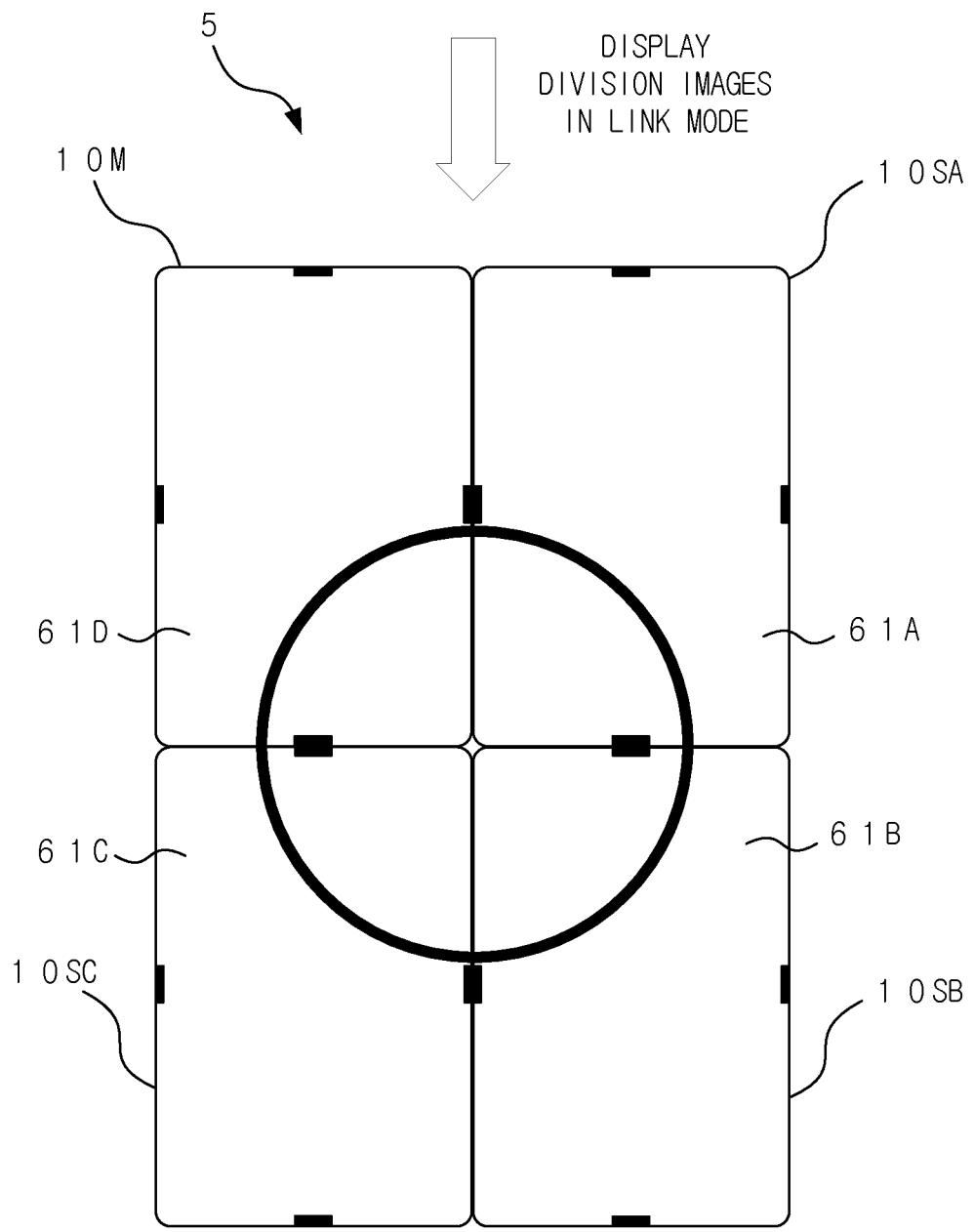
FIG. 7 is an explanatory view showing the situation in which the all screen display is carried out by a plurality of linked electronic papers.

When each slave device receives the display data from the electronic paper 10M (master device), each slave device displays the division image corresponding to the received display data on the whole of the display unit 31 of the slave device. The electronic paper 10M (master device) also displays the division image corresponding to the display data stored in the electronic paper 10M, on the whole of the display unit 31 of the electronic paper 10M. FIG. 7 shows the situation in which the electronic papers 10 display the image by linking the electronic papers 10 in accordance with the display data prepared by dividing the original image and enlarging the division images as shown in FIGS. 6A and 6B. The electronic paper 10M (master device) displays the enlarged division image 61D. The electronic paper 10SA displays the enlarged division image 61A. The electronic paper 10SB displays the enlarged division image 61B. The electronic paper 10SC displays the enlarged division image 61C. Thereby, the original image 60 is largely displayed in the expanded display area. That is, each of the electronic papers 10 displays the division image 61 received from the electronic paper 10M (master device) which functions as the information management unit, on the display unit 31. In case that the electronic paper 10 which receives the division image 61 is the electronic paper 10M which functions as the information management unit and the handwriting input device, receiving the division image 61 is that the electronic paper 10M prepares the corresponding division image 61 (in this example, division image 61D).

Figure 8:
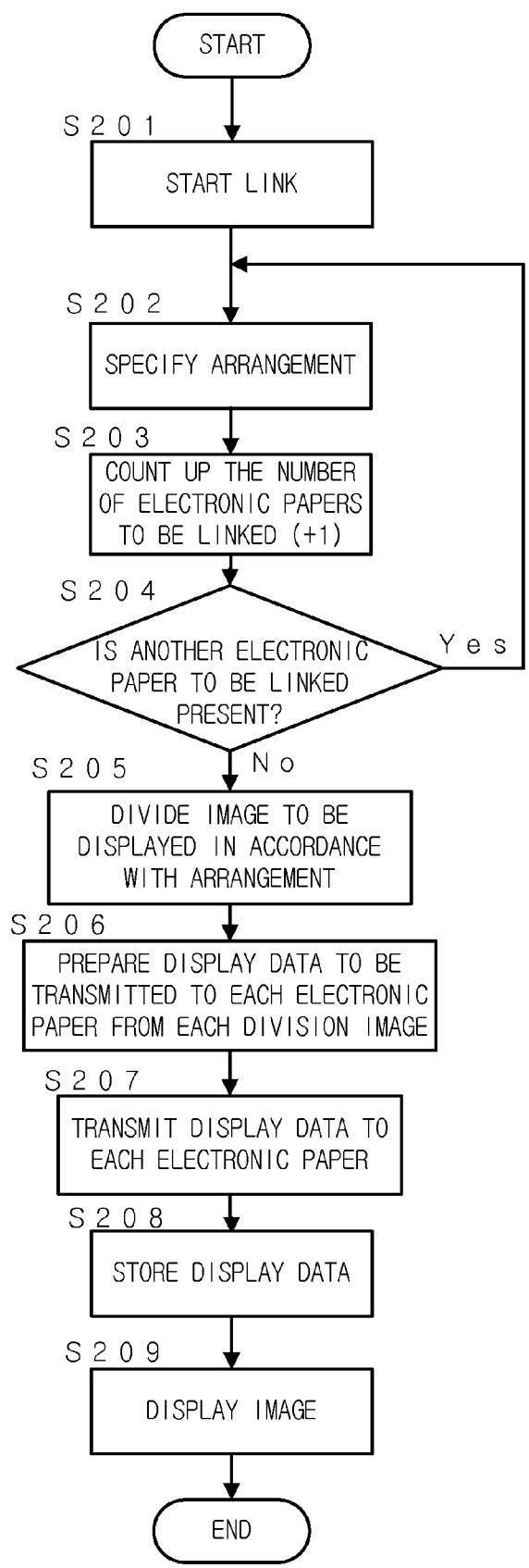
FIG. 8 is a flowchart showing the process which is carried out by the electronic paper 10M (master device) since the link among the electronic papers is started in the link mode till the all screen display is carried out.

FIG. 8 shows the process which is carried out by the electronic paper 10M (master device) since the electronic paper 10M starts the link mode till the electronic paper 10M instructs a plurality of linked electronic papers 10 to carry out the all screen display to enlarge one original image.

Firstly, when the electronic paper 10M (master device) receives the link mode starting operation (Step S201), the electronic paper 10M specifies the arrangement of the electronic paper 10 which can be linked with the electronic paper 10M and is adjacently arranged, one by one as described above (Step S202). When the arrangement of one electronic paper 10 is specified, the electronic paper 10M counts up the number of the electronic papers 10 to be linked (adds +1 to the number of the electronic papers 10 to be linked) (Step S203).

Until the electronic paper 10M specifies the arrangement of all of the electronic papers 10 which can be linked with the electronic paper 10M (Step S204; Yes), the electronic paper 10M continues the process by returning to Step S202. When the electronic paper 10M specifies the arrangement of all of the electronic papers 10 which can be linked (Step S204; No), the electronic paper 10M confirms a plurality of electronic papers 10 to be linked. At this time, the electronic paper 10M stores the information indicating the arrangement position of each electronic paper 10 to be linked (arrangement position information (also referred to as "relative position information")).

Next, the electronic paper 10M (master device) divides the original image to be displayed by the all screen display, in accordance with the arrangement information of each electronic paper to be linked (Step S205). The electronic paper 10M prepares the display data for largely displaying the division images obtained by dividing the original image (Step S206).

The electronic paper 10M transmits each display data obtained by enlarging the division image, to the electronic paper 10 arranged in the same relative position as the corresponding division image of the original image 60 (Step S207). At this time, the electronic paper 10M also transmits the instruction for displaying the image in accordance with the display data in the link mode. The display data used by the electronic paper 10M (master device) is stored in the image layer of the nonvolatile memory 14 (Step S208). Then, the electronic paper 10M (master device) displays the image obtained by overlapping the image based on the display data stored in the image layer in Step S208 and the image based on the draw data stored in the handwriting layer of the electronic paper 10M, on the display unit 31 (Step S209). The process is ended. In the initial state, there is no draw data in the handwriting layer.

In Step S209, each of the other linked electronic papers 10 stores the display data transmitted from the electronic paper 10M (master device) in its own image layer, and displays the image obtained by overlapping the image based on the stored display data and the image based on the draw data stored in its own handwriting layer, on the display unit 31. In the initial state, there is no draw data in the handwriting layer. Thereby, the original image 60 is displayed by the all screen display.

Figure 9:
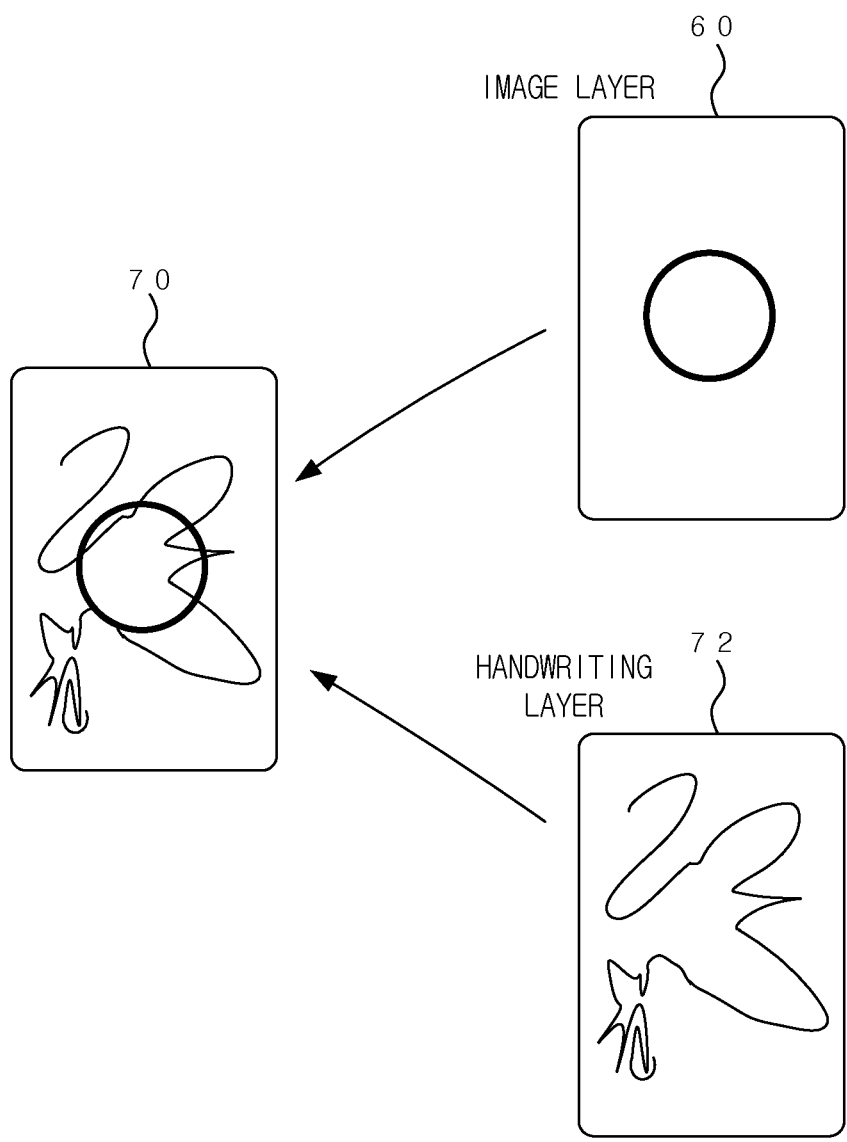
FIG. 9 is an explanatory view showing the situation in which the information relating to the handwriting input is managed.

Next, the management of the information relating to the handwriting input received by the electronic paper 10, is explained. FIG. 9 shows the situation in which one electronic paper 10 which operates in the single mode receives the handwriting input, such as additional description, correction or the like, and manages the information relating to the handwriting input.

The electronic paper 10 displays the original image 60 on the display unit 31, and receives the handwriting input for the original image 60 from a user. The original image 60 is stored in the image layer and the handwriting data 72 which is the draw data prepared in accordance with the handwriting input is stored in the handwriting layer. The contents of the handwriting layer (handwriting data 72) is updated every when the predetermined unit of handwriting input, such as one stroke in the handwriting input, is received. On the display unit 31, the overlapped image 70 obtained by overlapping the handwriting data 72 stored in the handwriting layer on the original image 60 stored in the image layer, is displayed.

Next, the method for managing the information relating to the handwriting input received by each electronic paper 10 in the link mode in which a plurality of electronic papers 10 are linked, is explained.

Firstly, each linked electronic papers 10 displays the received division image 61A to 61D on the display unit 31, and receives the handwriting input by the touch panel unit 34. When the electronic paper 10 receives the handwriting input from a user, the electronic paper 10 prepares the draw data indicating the draw contents based on the received handwriting input, in the handwriting layer. In case that the electronic paper 10 is the slave device, the electronic paper 10 adds its own assigned identification number (See FIG. 5) to the draw data stored in the handwriting layer (draw data of the whole handwriting layer surface) and transmits the draw data and the like to the electronic paper 10M (master device) which functions as the information management unit. One surface of draw data which corresponds to the contents to be displayed by one electronic paper 10 and which is prepared in the handwriting layer of each electronic paper 10 in the link mode, is referred to as the handwriting layer image 73. Further, in case that the source of the draw data is the electronic paper 10M which functions as the information management unit and the handwriting input device, transmitting the draw data is that the electronic paper 10M prepares or updates the corresponding draw data (in this example, handwriting layer image 73D (See FIG. 10A)).

Figure 10A:
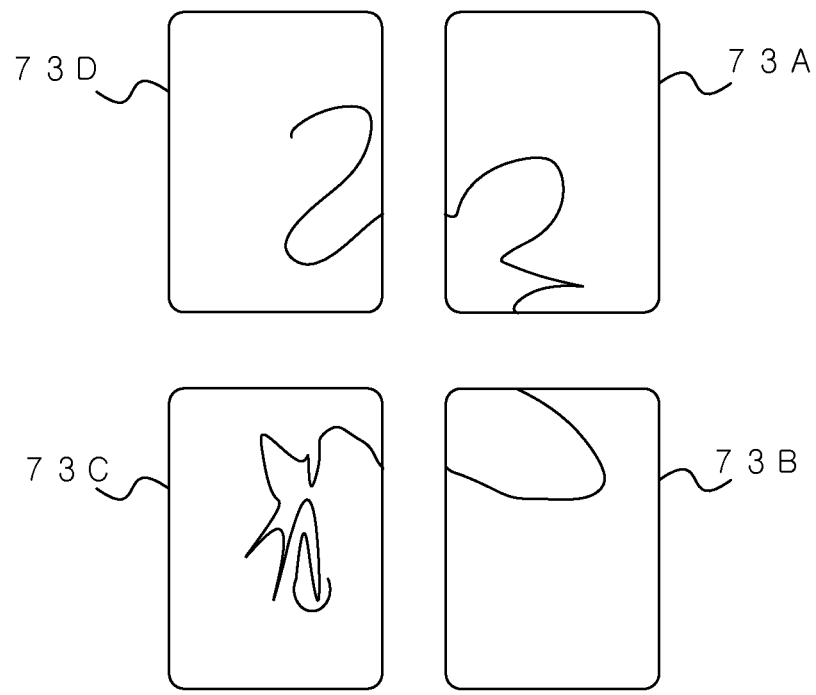
FIGS. 10A and 10B are explanatory views showing the situation in which the information relating to the handwriting input is managed by a plurality of linked electronic papers.

FIG. 10A shows the handwriting layer images 73 (73A, 73B, 73C and 73D) prepared in accordance with the handwriting input received by the electronic papers 10 (10M, 10SA, 10SB and 10SC) respectively, in the arrangement status shown in FIG. 5. The electronic paper 10M (master device) prepares the handwriting layer image 73D. The electronic paper 10SA prepares the handwriting layer image 73A. The electronic paper 10SB prepares the handwriting layer image 73B. The electronic paper 10SC prepares the handwriting layer image 73C.

Figure 10B:
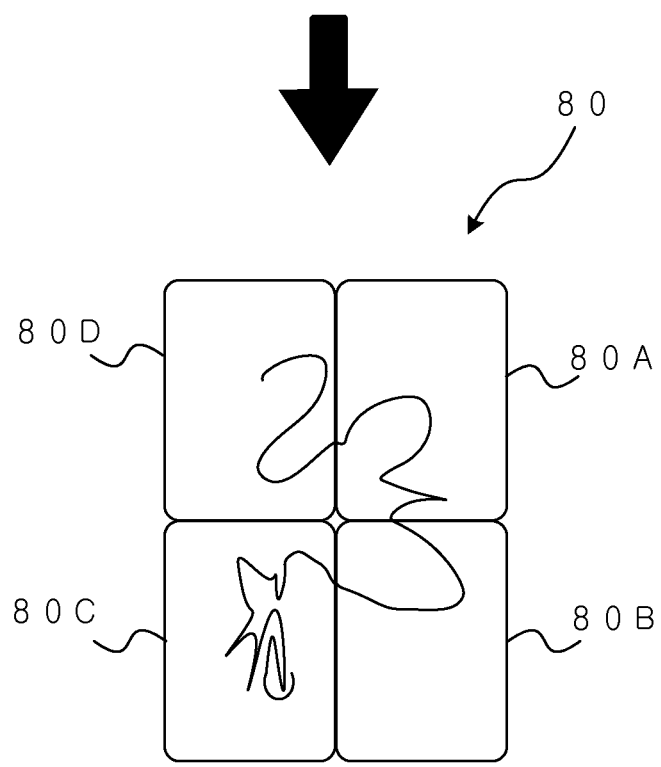

The electronic paper 10M (master device) relates the handwriting layer images 73A to 73C received from the respective slave devices, and the handwriting layer image 73D stored in the electronic paper 10M, to the arrangement positions (relative positions) of the respective electronic papers 10 which prepare the handwriting layer images 73A to 73D, to store them. In this case, as shown in FIG. 10B, the electronic paper 10M (master device) has the storing area for storing the handwriting layer images 73 prepared by all of the electronic papers 10 which operate in the link mode. The electronic paper 10M stores the handwriting layer images 73 prepared by the respective electronic papers 10, in the fields 80A to 80D of the storing area, which are assigned so as to correspond to the relative positions of the respective electronic papers 10.

Each electronic paper 10 updates the handwriting layer image 73 every when the predetermined unit of handwriting input, such as one stroke, is received. Each slave device transmits the updated handwriting layer image 73 to the electronic paper 10M (master device) every when the handwriting layer image 73 is updated.

When the electronic paper 10M (master device) receives the updated handwriting layer image 73, the electronic paper 10M carries out the overwrite save of the received handwriting layer image 73 for the field 80 of the storing area, which is assigned to the electronic paper 10 which transmits the updated handwriting layer image 73.

Figure 11:
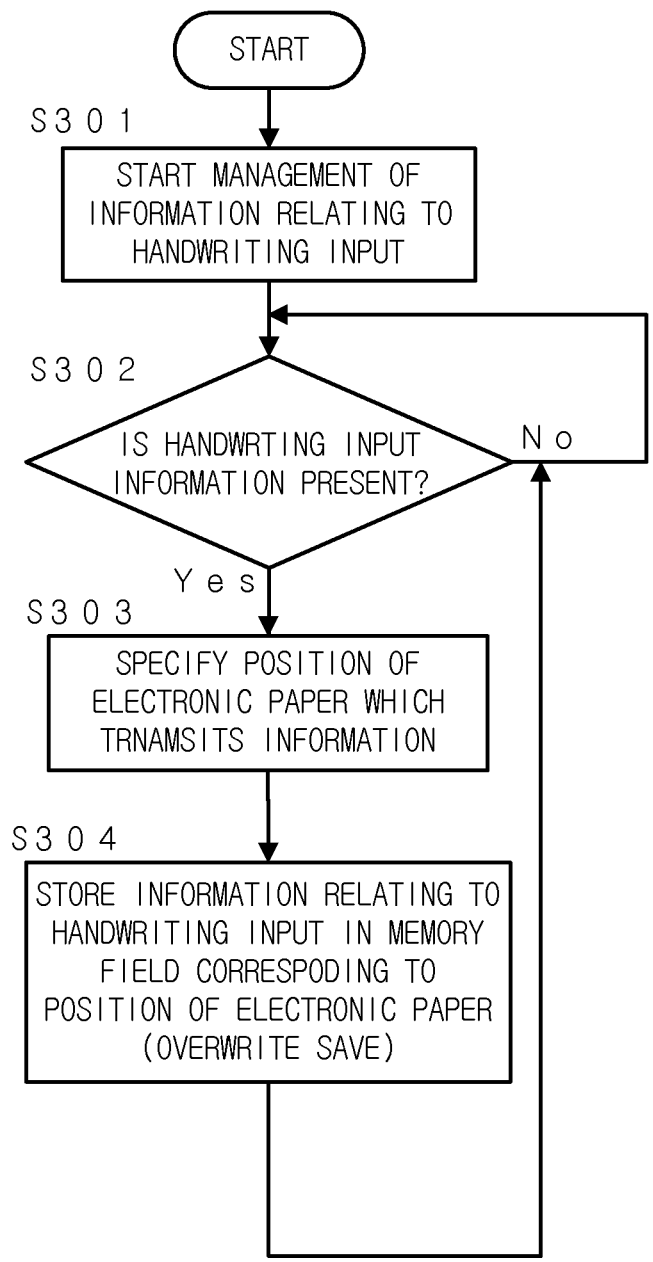
FIG. 11 is a flowchart showing the process in which the linked electronic paper 10M (master device) manages the information relating to the handwriting input received by each electronic paper.

FIG. 11 shows the process which is carried out by following the process shown in FIG. 8, and shows the process for managing the information relating to the handwriting input by the electronic paper 10M (master device). When the electronic paper 10M (master device) starts the management of the information relating to the handwriting input (Step S301), the electronic paper 10M monitors the reception of the handwriting input information (Step S302; No). In this example, there are two types of the reception of the handwriting input information. One is the reception of the handwriting input by the electronic paper 10M (master device). The other is the reception of the handwriting layer image 73 to which the identification number is attached from one slave device.

When the handwriting input information is received by one of the above two types of the reception of the handwriting input information (Step S302; Yes), the electronic paper 10M specifies the electronic paper 10 which prepares the handwriting input information and the arrangement position thereof (Step S303). In case that the handwriting layer image 73 is received as the handwriting input information from the slave device, the electronic paper 10M specifies the electronic paper 10 which prepares the received handwriting input information, in accordance with the identification number which is attached to the handwriting layer image 73.

The electronic paper 10M carries the overwrite save of the received handwriting input information (handwriting layer image 73) for the corresponding field 80 of the storing area (Step S304). Then, the electronic paper 10M continues the process by returning to Step S302.

The process shown in FIG. 11 is continued until the operation for finishing the handwriting input is received or until the link mode is finished. Alternatively, only when the handwriting input or the link mode is finished, the electronic paper 10M may collect the updated handwriting layer images 73 from the respective slave devices to store the handwriting layer images in the fields of the storing area.

Next, the method for confirming and storing the contents of the received handwriting input when the above link is cancelled (the link mode is finished), is explained.

When the electronic paper 10M (master device) receives the operation for finishing all of the handwriting inputs, or when the link mode is cancelled, the electronic paper 10M joins a plurality of handwriting layer images 73 stored in the fields 80 of the storing area to form one image. The electronic paper 10M reduces the draw data obtained by joining the handwriting layer images 73 so as to match with the size of the original image 60. For example, the electronic paper 10M (master device) prepares the reduced join image 74 which is reduced to the size in which the joined image can be displayed by one electronic paper 10. The above join is carried out so as to arrange the handwriting layer images 73 in the same relative positions as the electronic papers 10 which prepare the handwriting layer images 73. That is, the electronic paper 10M which functions as the information management unit joins the handwriting layer images 73 which are the draw data received from the electronic papers 10, so as to arrange the handwriting layer images 73 in the relative positions which are indicated by the relating position information of the electronic papers 10 which are adjacently arranged.

Figure 12:
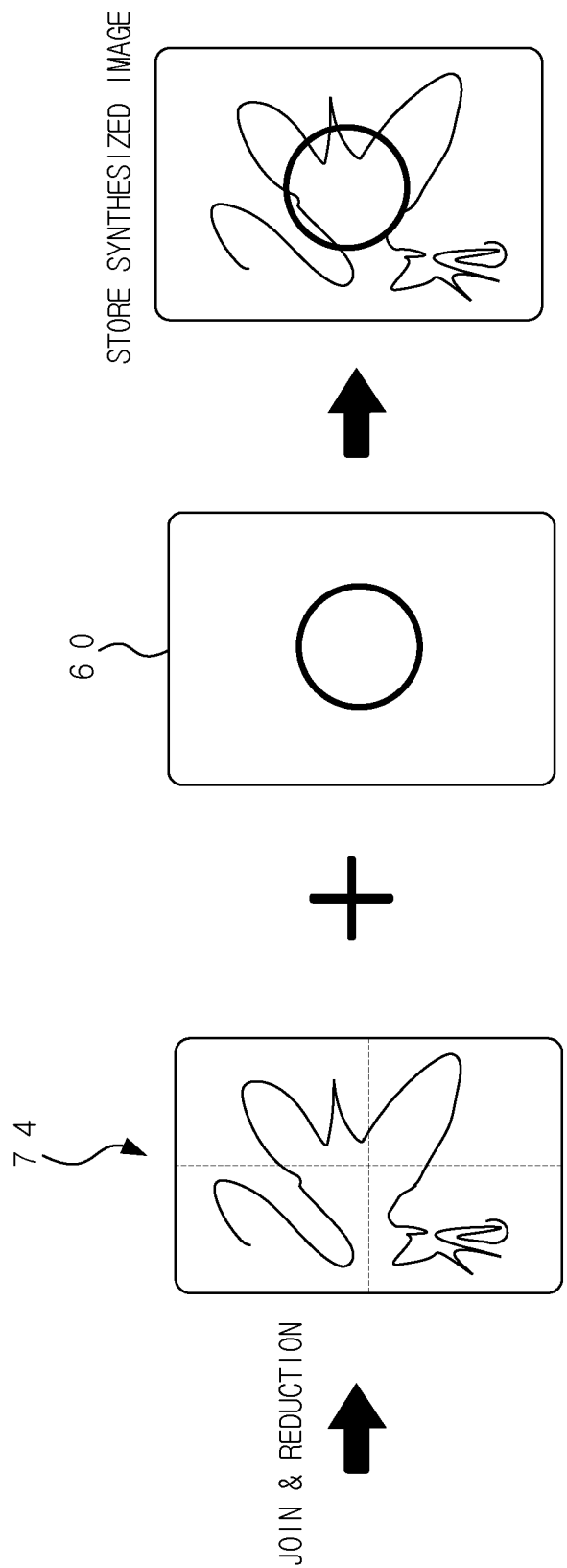
FIG. 12 is an explanatory view showing the situation in which the linked electronic paper 10M (master device) manages the information relating to the handwriting input received by each electronic paper so as to relate the information to the original image.

Further, the electronic paper 10M relates the reduced join image 74 to the image displayed by the all screen display (original image 60) and stores them. For example, the electronic paper 10M stores the reduced join image 74 and the original image 60 as data having the multi-layer structure by treating the reduced join image 74 as an image of the handwriting layer and the original image 60 as an image of the image layer. Alternatively, the electronic paper 10M may store the reduced join image 74 and the original image 60 as the synthesized image obtained by overlapping the reduced join image 74 on the original image 60. FIG. 12 shows the situation in which the synthesized image is prepared by overlapping the reduced join image 74 on the original image 60 to store the synthesized image.

Figure 13:
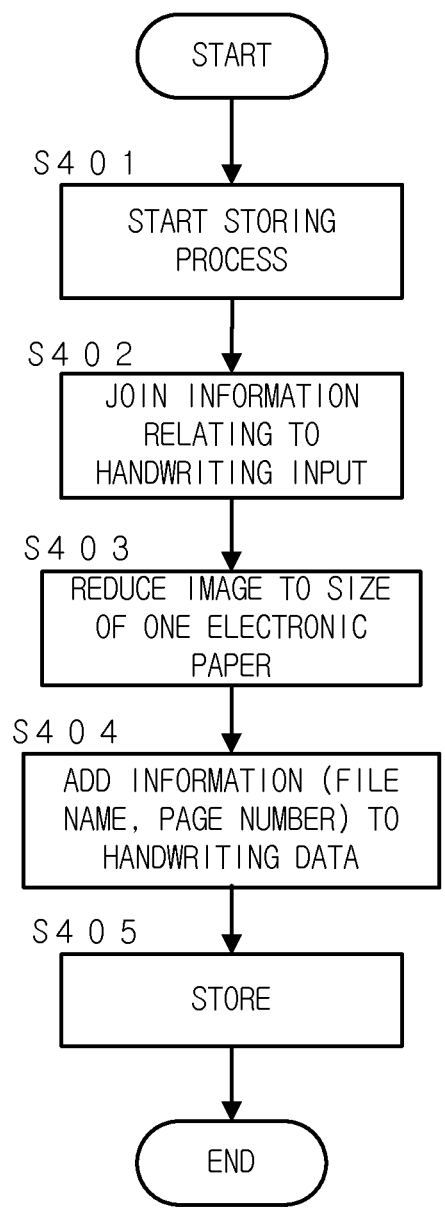
FIG. 13 is a flowchart showing the process in which the linked electronic paper 10M (master device) manages the information relating to the handwriting input received by each electronic paper so as to relate the information to the original image.

FIG. 13 shows the process in which the electronic paper 10M (master device) prepares the reduced join image 74 and relates the reduced join image 74 to the original image 60 to store them. Firstly, when the operation for finishing (confirming) the handwriting input is received or when the link mode is cancelled, the electronic paper 10M confirms the contents of the handwriting input and starts the process for storing the contents (Step S401). The electronic paper 10M (master device) joins a plurality of stored handwriting layer images 73 to form one image so as to arrange the handwriting layer images 73 in the same relative positions as the electronic papers 10 which prepares the handwriting layer images 73 (Step S402).

The electronic paper 10M prepares the reduced join image 74 by reducing the joined image obtained by the above join in Step S402 to the size in which the joined image can be displayed by one electronic paper 10 (Step S403). Then, the electronic paper 10M (master device) relates the reduced join image 74 to the original image 60 (Step S404). In the above relating, for example, the reduced join image 74 is related to the identification information of the original image (file name or in case of the original image which is included in one file having a plurality of pages, file name and the corresponding page number). Then, the reduced join image 74 which is related to the original image, is stored in the predetermined save area of the nonvolatile memory 14 in the electronic paper 10M (master device) (Step S405). The process shown in FIG. 13 is ended.

Further, it is possible to change the electronic paper 10 for storing the original image and the reduced join image 74 which are related to each other, from the electronic paper 10M (master device) to another slave device. In this case, after the electronic paper 10M (master device) carries out the process shown in FIG. 13, the electronic paper 10M may transmit the original image and the reduced join image 74 which are related to each other, to the electronic paper 10 which is designated by a user, in order to store them in the designated electronic paper 10.

Further, the original image 60 may be a white image or an image indicating blank data.

EXAMPLE 2

In the Example 2, in case that a user continuously draws a line so as to straddle a plurality of electronic papers 10, the draw data relating to the straddling line, which are detected as separate strokes by the respective electronic papers 10 are grouped and are treated as one continuous stroke.

Figure 14:
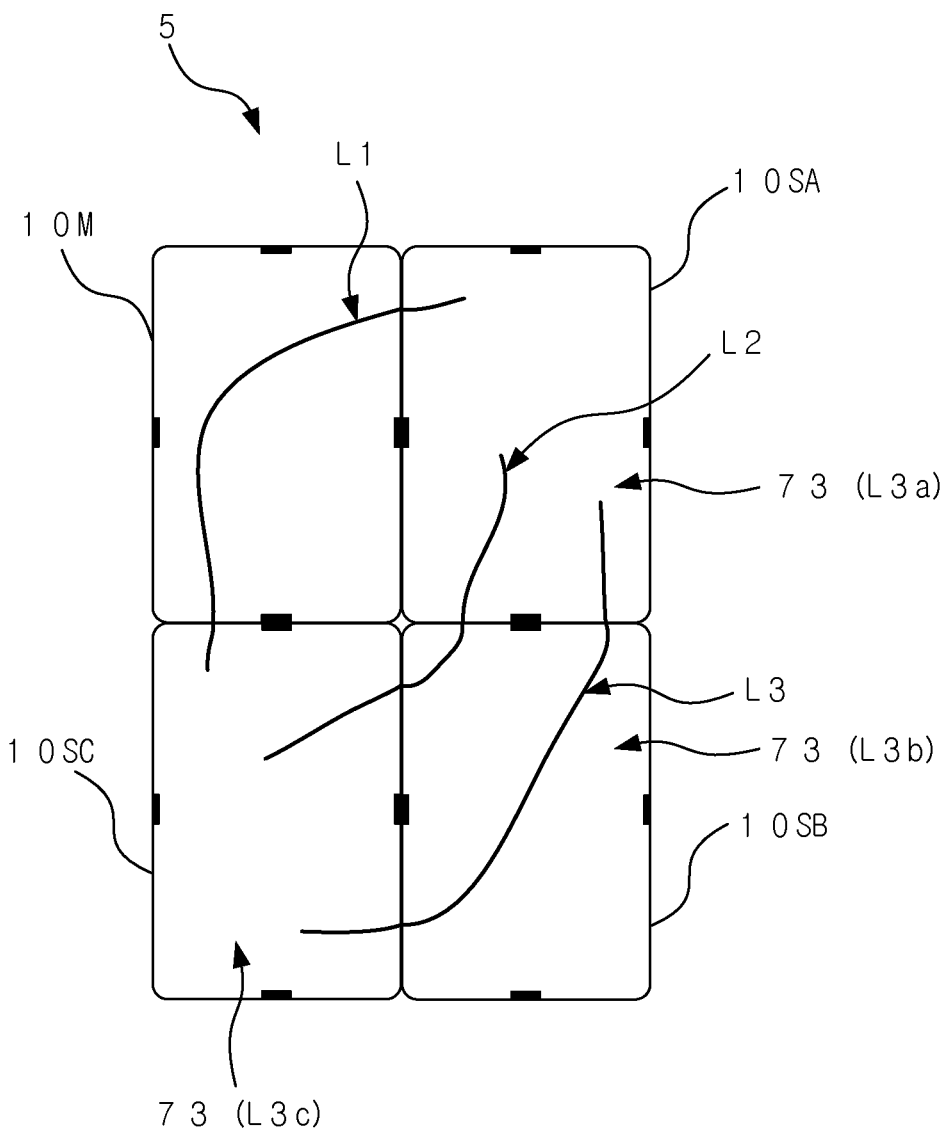
FIG. 14 is an explanatory view showing the situation in which the handwriting input system receives the handwriting input of the handwritten line L1, the handwritten line L2 and the handwritten line L3 in the link mode.

FIG. 14 shows an example of the draw contents of the handwriting input received by the handwriting input system 5 while a plurality of electronic papers 10 are linked. In FIG. 14, a user carries out the handwriting input for the linked electronic papers 10 (10M, 10SA, 10SB and 10SC) three times so as to straddle a plurality of electronic papers 10. In the input order of the handwriting input, the respective draw contents are denoted by the handwritten line L1, the handwritten line L2 and the handwritten line L3.

Every when one stroke of handwriting input is received, each electronic paper 10 writes and updates the draw data of one stroke of handwriting input and prepares the handwriting layer image 73 which is one surface of draw data corresponding to the contents stored in the handwriting layer of one electronic paper 10. At this time, each electronic paper 10 attaches the time information indicating the start time of the reception of the handwriting input and the finish time of the reception of the handwriting input, to the handwriting layer image 73. Every when the slave device prepares the handwriting layer image 73 by receiving one stroke of handwriting input, the slave device transmits the prepared handwriting layer image 73 to the electronic paper 10M (master device). The electronic paper 10M (master device) stores the handwriting layer images 73 prepared by the respective electronic papers 10, in the fields 80A to 80D (See FIG. 10B) of the storing area, which are assigned so as to correspond to the relative positions of the respective electronic papers 10.

In case that the electronic paper 10M (master device) receives a plurality of handwriting layer images 73, when a plurality of handwriting layer images 73 have the time continuity, the electronic paper 10M judges that the strokes drawn in the received handwriting layer images 73 (the updated strokes in the handwriting layer images 73) are a series of continuous stroke (continuous stroke).

For example, the handwritten line L3 shown in FIG. 14, indicates the handwriting input relating to the continuous stroke which is started on the electronic paper 10SA, passes through the electronic paper 10SB and is finished on the electronic paper 10SC. The electronic paper 10SA, the electronic paper 10SB and the electronic paper 10SC which receive the strokes indicated by the handwritten line L3, prepare the handwriting layer images 73 (L3a, L3b and L3c), respectively, and transmit the handwriting layer images 73 to the electronic paper 10M (master device). The references described in the above bracket following the handwriting layer images 73 denote the updated stroke in each handwriting layer image 73 and the drawing order in the strokes (which is indicated by the alphabetical order).

The time information attached to three handwriting layer images 73 (L3a, L3b and L3c) in which the handwritten line L3 is drawn, is as follows:

In case of the handwriting layer image 73 (L3a) prepared by the electronic paper 10SA, the start time is T0 and the finish time is T1.

In case of the handwriting layer image 73 (L3b) prepared by the electronic paper 10SB, the start time is T2 and the finish time is T3.

In case of the handwriting layer image 73 (L3c) prepared by the electronic paper 10SC, the start time is T4 and the finish time is T5.

In case that the time difference between the finish time T1 attached to the handwriting layer image 73 (L3a) received from the electronic paper 10SA and the start time T2 attached to the handwriting layer image 73 (L3b) received from the electronic paper 10SB (in this example, T2−T1) is within the predetermined time difference, the electronic paper 10M (master device) judges that the handwriting layer image 73 (L3a) received from the electronic paper 10SA and the handwriting layer image 73 (L3b) received from the electronic paper 10SB have the time continuity and that two updated strokes drawn in two handwriting layer images 73 (L3a and L3b) are a series of continuous stroke.

Similarly, in case that the time difference (T4−T3) is within the predetermined time difference, the electronic paper 10M judges that the handwriting layer image 73 (L3b) received from the electronic paper 10SB and the handwriting layer image 73 (L3c) received from the electronic paper 10SC have the time continuity and that two updated strokes drawn in two handwriting layer images 73 (L3b and L3c) are a series of continuous stroke. Thereby, the electronic paper 10M judges that all of the updated strokes drawn in three handwriting layer images 73 (L3a, L3b and L3c) are a series of continuous stroke.

Further, every when the continuous stroke is accomplished or when a separate stroke which is not a part of the continuous stroke is received, the electronic paper 10M (master device) prepares a temporary image (Temp). The temporary image is an image which is constituted by the handwriting layer images 73 stored in the respective fields 80 (80A to 80D) of the storing area when the temporary image is prepared. In the temporary image, the stored handwriting layer images 73 are arranged in the same relative positions as the electronic papers 10 which prepare the handwriting layer images 73. In this embodiment, in addition to the fields 80 of the storing area, three fields for storing the temporary images are prepared. In the above fields, three updated temporary images are stored. When a new temporary image is prepared in the situation in which the temporary images are stored in all of three fields, the oldest temporary image is deleted to store the new temporary image.

The process in which the temporary image is prepared and stored, is summarized as follows. Firstly, when the electronic paper 10M (master device) receives (or prepares) the handwriting layer image 73, the electronic paper 10M stores the handwriting layer image 73 in the field 80 of the storing area.

Then, in case that the electronic paper 10M (master device) receives (prepares) a new handwriting layer image 73, when the time difference between the start time which is attached to the received handwriting layer image 73 and the finish time which is attached to the newest handwriting layer image 73 among the handwriting layer images 73 stored in the fields 80 of the storing area is within the predetermined time difference, the electronic paper 10M judges that the handwritten strokes drawn in the above two handwriting layer images 73 (the updated strokes in the two handwriting layer images 73) are a series of continuous stroke. Further, the electronic paper 10M stores the received handwriting image 73 in the corresponding field 80 of the storing area.

In case that the time difference between the start time which is attached to the received handwriting layer image 73 and the finish time which is attached to the newest handwriting layer image 73 among the stored handwriting layer images 73 exceeds the predetermined time difference, because the updated stroke included in the received handwriting layer image is not continuous with the previous stroke, the electronic paper 10m prepares the temporary image in accordance with the handwriting layer images 73 which are currently stored in the fields 80 of the storing area. The electronic paper 10M stores the prepared temporary image in the predetermined storing field. Then, the electronic paper 10M stores the received handwriting layer image 73 in the corresponding field 80 of the storing area.

Thereby, every when the continuous stroke is accomplished or every when a separate stroke which is not continuous with another stroke is received, a new temporary image is prepared.

Figure 15:
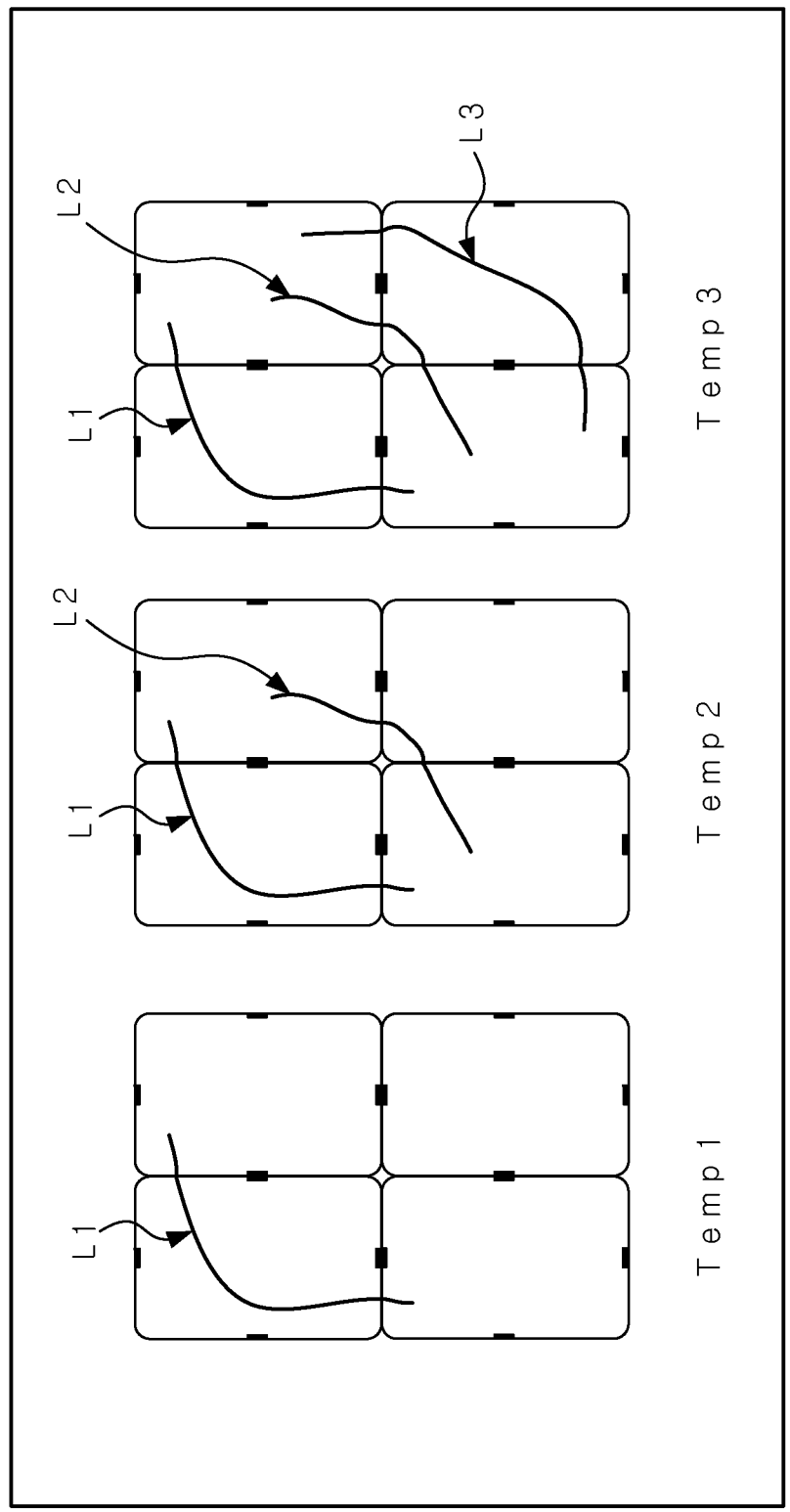
FIG. 15 is an explanatory view showing Temp1, Temp2 and Temp3 which are prepared and stored when the input of the handwritten line L1, the handwritten line L2 and the handwritten line L3 is received.
Figure 16:
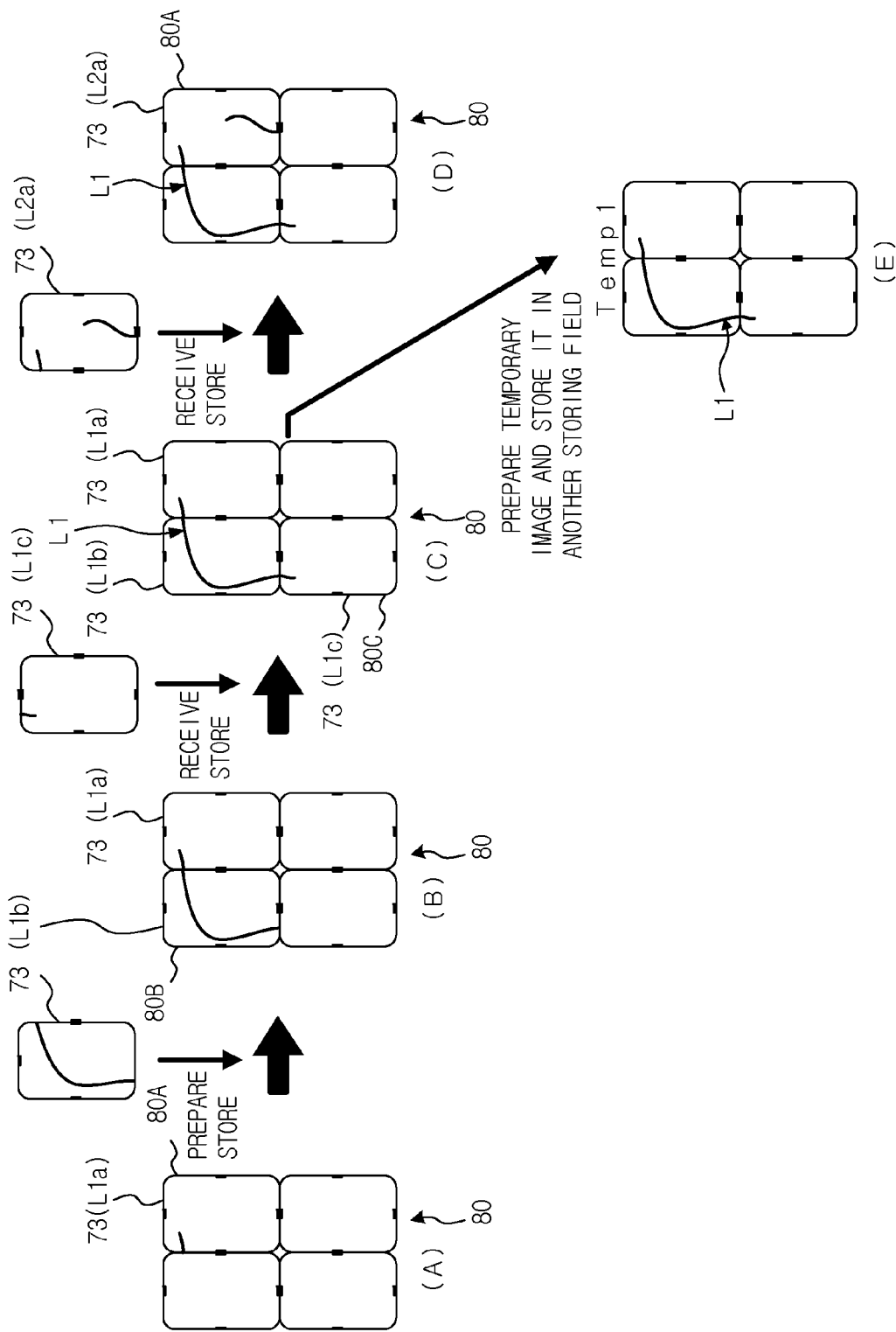
FIG. 16 is an explanatory view showing the process since the handwritten line L1 is input till the temporary image is prepared.

FIG. 15 shows three temporary images (Temp1, Temp2 and Temp3) which are prepared and stored when a user inputs the handwritten line L1, the handwritten line L2 and the handwritten line L3 in this order. Hereinafter, the process for preparing and storing the temporary image is explained by using the concrete examples. FIG. 16 shows the summary of the process since the input of the handwritten line L1 is received till the temporary image (Temp1) is prepared and stored.

The image Temp1 (See FIG. 15) is the temporary image prepared in accordance with the input of the handwritten line L1. The handwritten line L1 indicates the stroke which is started on the electronic paper 10SA, passes through the electronic paper 10M (master device) and is finished on the electronic paper 10SC. When the input of the handwritten line L1 is carried out, the handwriting layer images 73 (L1a, L1b and L1c) are prepared by the electronic papers 10 (10SA, 10M and 10SC), respectively.

Firstly, the electronic paper 10M (master device) receives the handwriting layer image 73 (L1a) prepared by the electronic paper 10SA, and stores the handwriting layer image 73 (L1a) in the field 80A of the storing area (See (A) in FIG. 16).

Next, the handwriting layer image 73 (L1b) is prepared by the electronic paper 10M (master device). Because the time difference between the start time which is attached to the handwriting layer image 73 (L1b) and the finish time which is attached to the handwriting layer image 73 (L1a) is within the predetermined time difference, the electronic paper 10M stores the handwriting layer image 73 (L1b) in the field 80B of the storing area (See (B) in FIG. 16).

Then, the electronic paper 10M receives the handwriting layer image 73 (L1c) from the electronic paper 10SC. Because the time difference between the start time which is attached to the handwriting layer image 73 (L1c) and the finish time which is attached to the handwriting layer image 73 (L1b) is within the predetermined time difference, the electronic paper 10M stores the handwriting layer image 73 (L1c) in the field 80C of the storing area (See (C) in FIG. 16).

When the draw of the handwritten line L2 is started, the electronic paper 10M (master device) receives the new handwriting layer image 73 (L2a) from the electronic paper 10SA. Because the time difference between the start time which is attached to the handwriting layer image 73 (L2a) and the finish time which is attached to the handwriting layer image 73 (L1c) prepared by the electronic paper 10SC exceeds the predetermined time difference, the electronic paper 10M prepares the temporary image (Temp1) in accordance with the handwriting layer images 73 (L1a, L1b and L1c) stored in the fields 80 of the storing area, and stores the prepared temporary image (Temp1) (See (E) in FIG. 16).

Then, the electronic paper 10M (master device) stores the handwriting layer image 73 (L2a) in the field 80A of the storing area (writes the handwriting layer image 73 (L2a) over the handwriting layer image 73 (L1a)) (See (D) in FIG. 16).

Similarly, the temporary images Temp2 and Temp3 are prepared and stored. The predetermined time difference may be set to the time enough to move a touch pen or user's finger so as to straddle two electronic papers 10, such as 1 second or the like.

Also, in case that a certain period of time elapses without receiving (preparing) a new handwriting layer image 73, the electronic paper 10M prepares the temporary image in accordance with the handwriting layer images 73 which are currently stored in the fields 80 of the storing area, and stores the prepared temporary image. The handwriting layer image 73 in which the stroke is input is prepared and transmitted after the reception of the above stroke is finished. In case of a long stroke, it takes a long time to receive the handwriting layer images 73 in which the above long stroke is input, by the electronic paper 10M (master device). When the electronic paper 10M receives a handwriting layer image 73, immediately after receiving the above handwriting layer image 73, the CPU 11 of the electronic paper 10M cannot judge whether the next handwriting layer image 73 which includes the long stroke forming the continuous stroke with the stroke drawn in the above received handwriting layer image 73, is transmitted to the electronic paper 10M or not. Therefore, after receiving a handwriting layer image 73, in case that the period of time which includes the longest possible time necessary to prepare and transmit the next handwriting layer image 73 including the above-described long stroke and a slightly extended period of time, elapses, the electronic paper 10M judges that there is a low possibility of receiving the next handwriting layer image 73 which includes the long stroke forming the continuous stroke with the stroke drawn in the above received handwriting layer image 73. As a result, the electronic paper 10M judges that the continuous stroke is accomplished by the strokes drawn in the received handwriting layer images 73 or that a separate stroke which is not a part of the continuous stroke is received, and prepares the temporary image.

The electronic paper 10M (master device) stores up to three temporary images prepared as described above. In case that a new temporary image is prepared in the situation in which three temporary images have been already stored, the electronic paper 10M stores the new temporary image by deleting the temporary image having the oldest preparation time.

By using the stored temporary images, it is possible to return the display contents to the contents of the prepared temporary image. For example, after a user inputs the handwritten line L1, the handwritten line L2 and the handwritten line L3 in this order and three temporary images (Temp1, Temp2 and Temp3) are prepared (See FIG. 15), the return operation is carried out once. As a result, the display contents are returned to the contents of Temp2, that is, the display contents which are displayed before the handwritten line L3 is input. Therefore, the handwritten line L3 which indicates the continuous stroke is a stroke to be cancelled by carrying out the return operation once.

When the display contents are returned, the electronic paper 10M (master device) transmits four handwriting layer images 73 forming Temp2 to the respective electronic papers 10 which prepare the handwriting layer images 73. Each electronic paper 10 which receives the handwriting layer image 73 carries out the overwrite save of the contents of the received handwriting layer image 73 for its own handwriting layer. Then, when the return operation is carried out once more, the display contents are returned to the contents of Temp1, that is, the display contents which are displayed before the handwritten line L2 and the handwritten line L3 are input (See FIG. 15). Therefore, the handwritten line L2 which indicates the continuous stroke is a stroke to be cancelled by carrying out the return operation once.

Figure 17:
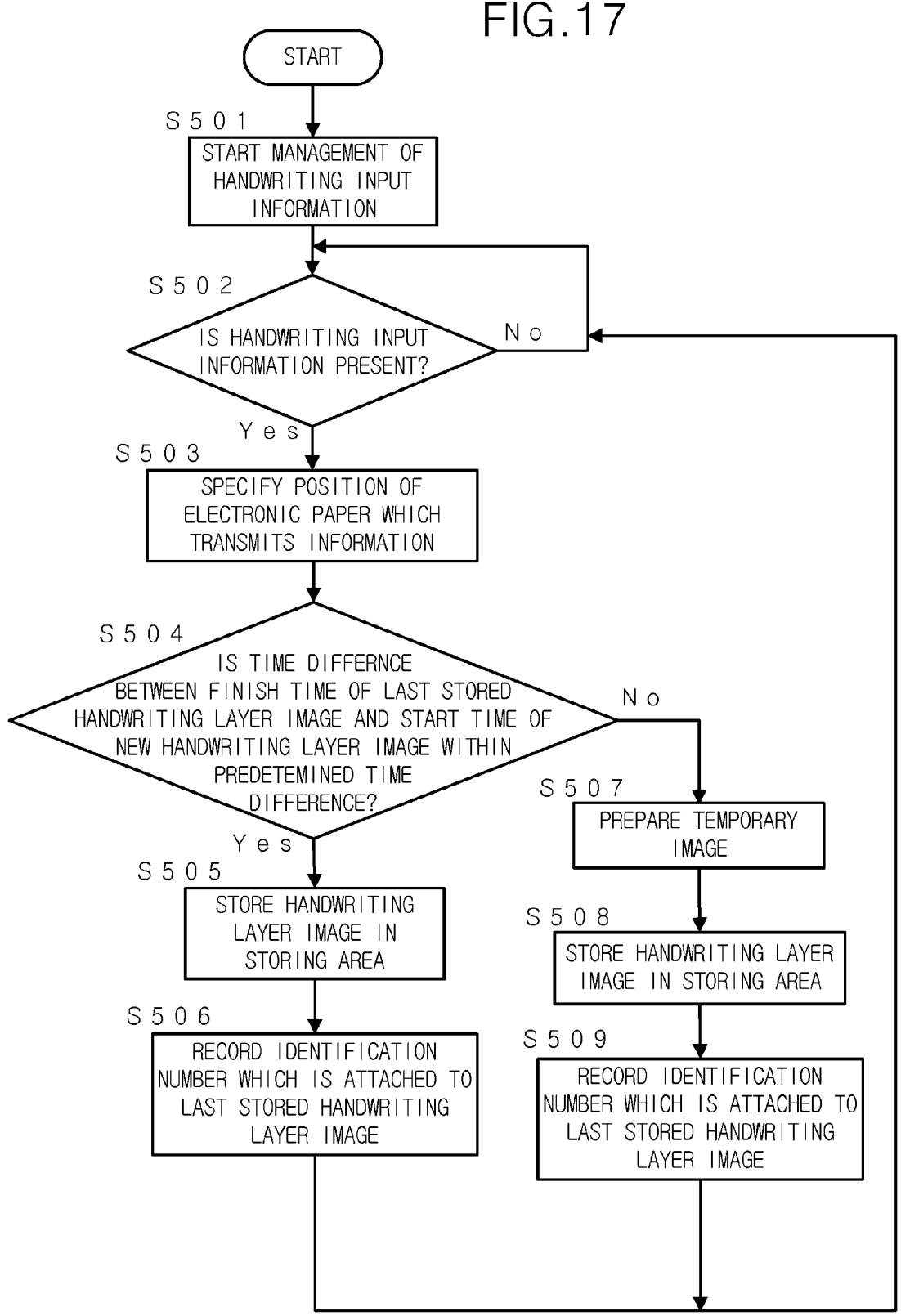
FIG. 17 is a flowchart showing the process for receiving the handwriting input and preparing and storing the temporary image.

FIG. 17 shows the process which is carried out by following the process shown in FIG. 8, and shows the process for starting the link mode in which a plurality of electronic papers are linked, preparing and storing the temporary image by the electronic paper 10 which is the electronic paper 10M (master device).

When the link mode is started, the electronic paper 10M (master device) starts the management of the handwriting input information (Step S501), and monitors the reception of the handwriting input information (Step S502). There are two types of the reception of the handwriting input information. One is the reception of the handwriting input by the electronic paper 10M (master device). The other is the reception of the handwriting layer image 73 to which the identification number is attached from one slave device. Even in case that the electronic paper 10M (master device) receives the handwriting input, the handwriting layer image 73 to which the identification number is attached is prepared. The handwriting layer image 73 prepared by the electronic paper 10M is treated like the handwriting layer image 73 received from the slave device.

When the handwriting input information is received by one of the above two types of the reception of the handwriting input information (Step S502; Yes), the electronic paper 10M specifies the electronic paper 10 which prepares the handwriting input information and the arrangement position thereof (Step S503). In case that the handwriting layer image 73 is received as the handwriting input information from the slave device, the electronic paper 10M specifies the electronic paper 10 which prepares the received handwriting input information, in accordance with the identification number which is attached to the handwriting layer image 73.

In Step S504, in case that no handwriting layer image 73 is stored in the field 80 of the storing area, the process proceeds to Step S505. In Step S504, in case that the handwriting layer image 73 is stored in the field 80 of the storing area, the electronic paper 10M checks whether the time difference between the finish time which is attached to the handwriting layer image 73 which is stored most recently among the stored handwriting layer images 73 and the start time which is attached to the new handwriting layer image 73 received in Step S502 is within the predetermined time difference.

In case that the above time difference is within the predetermined time difference (Step S504; Yes), the electronic paper 10M stores the new handwriting layer image 73 received in Step S502, in the field 80 of the storing area which corresponds to the arrangement position specified in Step S502 (Step S505). Further, the electronic paper 10M records the identification number attached to the stored handwriting layer image 73 (Step S506). Then, the electronic paper 10M continues the process by returning to Step S502. Further, in Step S504, the electronic paper 10M recognizes the handwriting layer image 73 to which the identification number recorded in Step S506 (or in Step S509 which is described later) is attached, as the recently stored handwriting layer image 73.

In case that the above time difference exceeds the predetermined time difference (Step S504; No), the electronic paper 10M prepares the temporary image in accordance with the handwriting layer images 73 which are currently stored in the fields 80 of the storing area (Step S507) and stores the prepared temporary image. Then, the electronic paper 10M stores the new handwriting layer image 73 received in Step S502, in the corresponding field 80 of the storing area (Step S508), and records the identification number which is attached to the stored handwriting layer image 73 (Step S509). Then, the electronic paper 10M continues the process by returning to Step S502. The process shown in FIG. 17 is continued until the operation for finishing the handwriting input is received or until the link mode is finished.

In Step S507, in case that the temporary images have been already stored to the limit of the number of the stored temporary images, the electronic paper 10M deletes the temporary image having the oldest updated time (the oldest preparation time) and stores the new temporary image in the field in which the deleted temporary image is stored.

The electronic paper 10M (master device) manages the handwriting input information by treating the strokes drawn in a plurality of handwriting layer images 73 having the time continuity as the continuous stroke. Thereby, in case that a user draws the line so as to straddle a plurality of electronic papers 10, the drawn line which is intended as one line by the user is coincident with the continuous stroke which is managed by the electronic paper 10M (master device). For example, in case that the return operation for returning the input contents is carried out, the amount of the stroke to be cancelled, which is expected by the user, is coincide with the amount of the stroke which is cancelled by the electronic paper 10M (master device).

EXAMPLE 3

In Example 1, when a plurality of electronic papers 10 are linked in the link mode, the division images obtained by enlarging one image and dividing the enlarged image by the electronic paper 10M (master device), are assigned to the respective electronic papers 10 to display the division images by the respective electronic papers 10. However, in Example 3, when a plurality of electronic papers 10 are linked, the electronic paper 10M (master device) instructs each electronic paper 10 to display own image which is originally held by each electronic paper 10 on the display unit 31 of each electronic paper 10.

FIGS. 18A and 18B show the situation in which the electronic papers 10 of the handwriting input system 5 are linked in the link mode and each electronic paper 10 receives the handwriting input in Example 3. In FIGS. 18A and 18B, four electronic papers 10 (10M, 10SA, 10SB and 10SC) do not display the division images which are obtained by enlarging one image and dividing the enlarged image and which are assigned to the respective electronic papers 10. In FIGS. 18A and 18B, the electronic papers 10 display own images (third images 62D, 62A, 62B and 62C) which are originally held by the electronic papers 10, respectively, on the respective display units 31 (See FIG. 18A).

Each electronic paper 10 receives the handwriting input for the image displayed on the display unit 31. When each electronic paper 10 receives the handwriting input, each electronic paper 10 prepares the handwriting data 72 (See FIG. 9) based on the received handwriting input, in the handwriting layer. The contents of the handwriting layer are updated every when the predetermined unit of handwriting input, such as one stroke in the handwriting input, is received. On each display unit 31, the overlapped image 63 (63A, 63B, 63C and 63D) obtained by overlapping the handwriting data 72 which is the draw data stored in the handwriting layer on the image stored in the image layer, that is, own image which is held by each electronic paper 10, is displayed (See FIG. 18B).

Then, the link mode is finished and the process for storing the display contents of each electronic paper 10 is started.

FIGS. 19A to 19C show the situation in which the storing process which is started from the situation shown in FIG. 18B, is carried out. Firstly, the electronic paper 10 which is the electronic paper 10M (master device) selected among four electronic papers 10 transmits the instruction for transmitting the overlapped image 63, to the other electronic papers 10 (slave device). Each slave device which receives the above instruction, transmits the overlapped image 63 to the electronic paper 10M (master device). The electronic paper 10M (master device) obtains the overlapped images 63 (See FIG. 19A). Further, in case of the electronic paper 10M which functions as the information management unit and the handwriting input device, the electronic paper 10M obtains the overlapped image 63D by preparing or updating the overlapped image 63D.

Next, the electronic paper 10M (master device) joins the overlapped images 63 received from the slave devices, so as to arrange the overlapped images 63 in the same relative positions as the electronic papers 10 which transmit the overlapped images 63, to obtain one image (See FIG. 19B). In FIG. 19B, the overlapped image 63A transmitted from the electronic paper 10SA which is arranged in the upper right part of the handwriting system 5, is arranged in the upper right part of one image to be obtained. The overlapped image 63B transmitted from the electronic paper 10SB which is arranged in the lower right part of the handwriting system 5, is arranged in the lower right part of one image to be obtained. The overlapped image 63C transmitted from the electronic paper 10SC which is arranged in the lower left part of the handwriting system 5, is arranged in the lower left part of one image to be obtained. The overlapped image 63D held by the electronic paper 10M (master device) which is arranged in the upper left part of the handwriting system 5, is arranged in the upper left part of one image to be obtained. Then, the arranged overlapped images are joined to obtain one image. That is, the electronic paper 10M which functions as the information management unit joins the overlapped images of the respective electronic papers 10 so as to arrange the overlapped images in the relative positions indicated by the relative position information of each electronic paper, which is obtained as described in the above Example 1.

Then, the image (data) obtained by joining the overlapped images is reduced to the size in which the image is displayed by one electronic paper 10, and is stored (See FIG. 19C).

Instead of the overlapped image 63, each electronic paper 10 may transmit the image stored in the image layer (the own image held by each electronic paper 10) and the image stored in the handwriting layer (draw data) separately, to the electronic paper 10M (master device) which functions as the information management unit. The electronic paper 10M (master device) may join the own images held by the respective electronic papers 10 and the draw data separately so as to arrange them on the separate layers in the relative positions indicated by the relative position information of each electronic paper 10. Further, the electronic paper 10M may reduce the joined draw data and the image obtained by joining the own images, for example, to the size in which the obtained image and the joined draw data are displayed by one electronic paper 10, and store the reduced image and the reduced draw data so as to relate them to each other.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the case in which electronic paper 10 is used as an example of the handwriting input device, is explained. The handwriting input device is not limited to this. A tablet terminal, a portable terminal or the like may be used.

In the handwriting input system 5 of the embodiment, the electronic paper 10 which is selected as the electronic paper 10M (master device) manages the image to be displayed on the respective display units 31 of a plurality of linked electronic papers 10 and the information relating to the handwriting input, as the information management unit of the handwriting input system 5. However, an input contents management server may be provided as a device which is independent from the electronic paper 10. The input contents management server may control the link among a plurality of electronic papers. For example, the input contents management server transmits the image to be displayed on the display unit 31 of each linked electronic paper 10 and collectively manages the draw contents of the handwriting input received by each electronic paper 10. In this case, the input contents management server comprises an obtaining unit to obtain draw data indicating draw contents of a handwriting input received by an input surface of each of a plurality of handwriting input devices which are adjacently arranged, and an image displayed on a display unit of each of the plurality of handwriting input devices, from each handwriting input device by overlapping the image and the draw data or by separating the draw data from the image; each handwriting input device comprising the input surface to receive the handwriting input, and the display unit in which the input surface is formed on a display surface to display the image; an arrangement information obtaining unit to obtain relative position information of the plurality of handwriting input devices which are adjacently arranged; a storing unit; a joining unit to join the images and the draw data which are obtained from the plurality of handwriting input devices by overlapping the image and the draw data or by separating the draw data from the image, so as to arrange the images and the draw data in relative positions indicated by the relative position information; and a control unit to reduce data contents obtained by joining the images and the draw data, to a size in which the data contents are displayed by one handwriting input device, and to store the reduced data contents in the storing unit. Further, the present invention may be applied to the input contents management method for managing the information relating to the handwriting input and the like, and the tangible computer-readable recording medium which stores the program for executing the above-described input contents management method.

The above Examples 1 to 3 may be optionally combined. However, the above combination is carried out as long as the consistency between the Examples is not lacked. For example, in case that the Example 1 is combined with the Example 3, the method for displaying an image by the all screen display and the method for displaying an own image held by each handwriting input device cannot be carried out at the same time. Therefore, by providing a switch button for switching between the above two methods, the method to be carried out may be switched between the above two methods (the operation described in the Example 1 and the operation described in the Example 3).

Figure 20B:
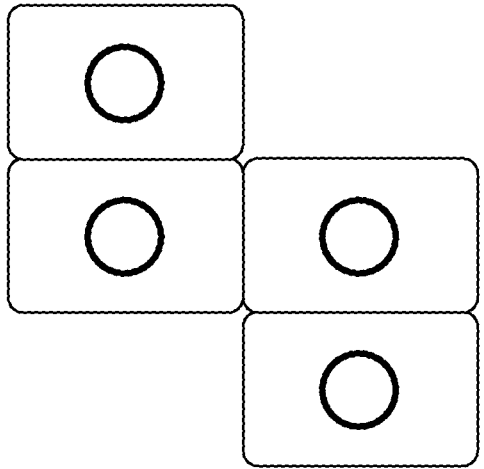
FIGS. 20A and 20B are explanatory views showing examples of the arrangement of the electronic papers.
Figure 20A:
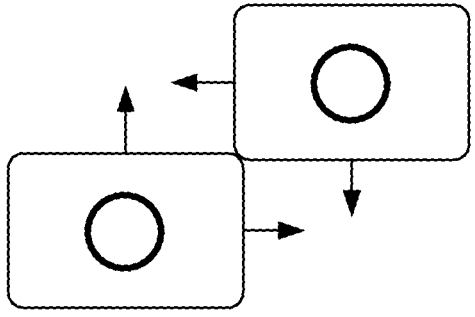

In the embodiment, four linked electronic papers 10 are arranged in 2×2 matrix form. However, the linked handwriting input devices may be arranged in 1×4 matrix form. Further, the number of the linked handwriting input devices is not limited to 4. In the handwriting input system, a plurality of handwriting input devices may be linked. In the arrangement shown in FIG. 20A, because the electronic paper 10M (master device) cannot recognize the arrangement of the electronic papers, the operation to be carried out in the link mode is impossible. In the arrangement shown in FIG. 20B, the display method described in the Example 3 can be carried out (an own image held by each electronic paper 10 can be displayed). The all screen display described in the Example 1 cannot be carried out. In order to carry out the all screen display, it is preferable to arrange the electronic papers so as to form a similar shape to an image to be displayed by one electronic paper 10.

One of the objects of the above embodiment is to provide a handwriting input system, an input contents management server and a tangible computer-readable recording medium which can collectively manage the information relating to the handwriting input received from a plurality of handwriting input devices which are adjacently arranged.

In the embodiment, the information management unit obtains the draw data indicating the draw contents of the handwriting input received from a plurality of handwriting input devices which are adjacently arranged. Further, the information management unit obtains the relative position information of a plurality of handwriting input devices which are adjacently arranged, and joins the draw data obtained from a plurality of handwriting input devices so as to arrange the draw data in the relative positions indicated by the relative position information. Thereby, it is possible to easily manage the draw data indicating the draw contents of the handwriting input received by each handwriting input device.

In the embodiment, the original image is divided in accordance with the relative positions of a plurality of handwriting input devices. The information management unit transmits the division images obtained by dividing the original image, to the handwriting input devices arranged in the same relative positions as the division images of the original image, respectively, and instructs the handwriting input devices to display the division images. Further, each of the handwriting input devices receives the handwriting input while the received division image is displayed. Thereby, it is possible to largely display the original image by using the display surfaces of a plurality of handwriting input devices which are adjacently arranged, and to receive the handwriting input, such as additional description, correction or the like, for the original image which is largely displayed.

In the embodiment, the original image is largely displayed by using the display surfaces of a plurality of handwriting input devices which are adjacently arranged. Further, in case that the handwriting input is received for the image which is largely displayed, the draw data indicating the draw contents of the handwriting input are joined so as to arrange the draw data in the same relative positions as a plurality of handwriting input devices which are adjacently arranged. Further, the joined draw data is reduced to the size of the original image. The reduced draw data is stored so as to relate the reduced draw data to the original image. Thereby, it is possible to display the original image and the reduced draw data by one handwriting input device.

In the embodiment, the original image may be a white image. Further, the original image may be an image indicating blank data. The image indicating the blank data is, for example, an image which is colorless and transparent.

In the embodiment, each of a plurality of handwriting input devices which are adjacently arranged, receives the handwriting input in the situation in which each of the handwriting input devices displays the own image held by each handwriting input device. The information management unit obtains the draw data indicating the contents of the handwriting input received by each handwriting input device and the image displayed by each handwriting input device by overlapping the own image and the draw data or by separating the draw data from the own image, so as to arrange the own images and the draw data in the above relative positions. Then, the data contents obtained by joining the own images and the draw data are stored. In case that the information management unit obtains the draw data and the own images separately, the join of the own images and the join of the draw data are separately carried out. Then, the joined draw data and the image obtained by joining the own images are stored so as to relate them to each other. Therefore, by reading out the stored image and the stored draw data, it is possible to, for example, reproduce the display contents by overlapping the joined draw data on the image obtained by joining the own images.

In the embodiment, the images displayed by a plurality of handwriting input devices which are adjacently arranged and the contents of the handwriting input are joined, reduced and stored. Therefore, by reading out the stored contents, it is possible to display the stored contents by one handwriting input device.

In the embodiment, in case that a user draws a line so as to straddle a plurality of handwriting input devices, the line is detected as separate strokes by the respective handwriting input devices. In case that the separate strokes have the time continuity, a plurality of separate strokes which are separately detected are grouped into one continuous stroke. Then, the continuous stroke is treated as the stroke to be cancelled by carrying out the return operation once. For example, when the return operation is carried out once, the input contents are returned to the contents which have been input before the above continuous stroke is input.

The present U.S. patent application claims the priority of Japanese Patent Application No. 2012-167762, filed on Jul. 27, 2012, according to the Paris Convention, and the entirety of which is incorporated herein by reference for correction of incorrect translation.

What is claimed is:

1. A handwriting input system comprising:
a plurality of handwriting input devices which are adjacently arranged, each handwriting input device comprising an input surface to receive a handwriting input and a respective display device; and
an information management unit which is connected with the handwriting input devices so as to communicate with the handwriting input devices,
wherein each of the plurality of handwriting input devices transmits draw data indicating draw contents of the handwriting input received by the input surface, to the information management unit,
the information management unit obtains relative position information of each of the plurality of handwriting input devices which are adjacently arranged, and joins the draw data based on a relative position or relative positions corresponding to the relative position information, the draw data being received from each of the plurality of handwriting input devices so as to arrange the draw data in relative positions indicated by the relative position information, and
when the plurality of handwriting input devices are adjacently arranged, the information management unit displays the joined draw data on the respective display devices of the plurality of handwriting input devices as one display.

2. The handwriting input system of claim 1, wherein each of the handwriting input devices further comprises a display unit in which the input surface is formed on a display surface to display an image,
the information management unit transmits division images obtained by dividing an original image into the number of the handwriting input devices in accordance with the relative position information, to the handwriting input devices arranged in same relative positions as the division images of the original image, respectively, and each of the handwriting input devices displays the division image received from the information management unit, on the display unit, and receives the handwriting input by the input surface.

3. The handwriting input system of claim 2, wherein the information management unit reduces the joined draw data so as to match with a size of the original image, and stores the reduced draw data so as to relate the reduced draw data to the original image.

4. The handwriting input system of claim 2, wherein the original image is a white image or an image indicating blank data.

5. The handwriting input system of claim 1, wherein each of the handwriting input devices further comprises a display unit in which the input surface is formed on a display surface to display an image, each of the handwriting input devices displays a respective image held by each respective handwriting input device on the display unit, receives the handwriting input by the input surface and transmits the respective image and the draw data to the information management unit by overlapping the respective image and the draw data or by separating the draw data from the respective image, and the information management unit joins the respective images and the draw data received from the plurality of handwriting input devices by overlapping the image and the draw data or by separating the draw data from the respective image of each of the handwriting input devices, so as to arrange the respective images and the draw data in the relative positions indicated by the relative position information.

6. The handwriting input system of claim 5, wherein the information management unit reduces data contents obtained by joining the respective images and the draw data, to a size in which the data contents are displayed by one handwriting input device, and store the reduced data contents.

7. The handwriting input system of claim 1, wherein every time when each of the handwriting input devices receives one stroke of the handwriting input by the input surface, the handwriting input device which receives the one stroke of the handwriting input transmits the draw data indicating the draw contents of the handwriting input, to the information management unit, when the draw data received from one of the handwriting input devices, which includes a first updated one stroke of the handwriting input, and the draw data received from another of the handwriting input devices, which includes a second updated one stroke of the handwriting input, have a time continuity, the information management unit groups the first updated one stroke of the handwriting input and the second updated one stroke of the handwriting input into a continuous stroke, and the information management unit treats the continuous stroke as a stroke to be cancelled by carrying out a return operation once.

8. The handwriting input system of claim 1, wherein the information management unit obtains the relative position information from each of the plurality of handwriting input devices.

9. The handwriting input system of claim 1, wherein, when a first handwriting input device is arranged adjacent to a second handwriting input device, the information management unit obtains at least relative position information of the second handwriting input device with respect to the first handwriting input device and joins the draw data based on a relative position corresponding to the relative position information, the draw data being received from each of the first handwriting input device and the second handwriting input device.

10. An input contents management server, comprising:
an obtaining unit to obtain draw data indicating draw contents of a handwriting input received by an input surface of each of a plurality of handwriting input devices which are adjacently arranged, and a respective image displayed on a display unit of each of the plurality of handwriting input devices, from each handwriting input device by overlapping the respective image and the draw data or by separating the draw data from the respective image;

each handwriting input device comprising the input surface to receive the handwriting input, and the display unit in which the input surface is formed on a display surface to display the respective image;

an arrangement information obtaining unit to obtain relative position information of each of the plurality of handwriting input devices which are adjacently arranged;

a storing unit;

a joining unit to join the respective images and the draw data, based on a relative position or relative positions corresponding to the relative position information, the draw data being obtained from each of the plurality of handwriting input devices by overlapping the respective image and the draw data or by separating the draw data from the respective image of each of the handwriting input devices, so as to arrange the respective images and the draw data in relative positions indicated by the relative position information; and a control unit to reduce data contents obtained by joining the respective images and the draw data, to a size in which the data contents are displayed by one handwriting input device, and to store the reduced data contents in the storing unit.

11. The input contents management server of claim 10, wherein the control unit transmits division images obtained by dividing an original image into the number of the handwriting input devices in accordance with the relative position information, to the handwriting input devices arranged in the same relative positions as the division images of the original image, respectively, and the control unit instructs each of the handwriting input devices to display the division image received from the control unit, on the display unit, and to receive the handwriting input by the input surface.

12. The input contents management server of claim 11, wherein the control unit reduces the joined draw data so as to match with a size of the original image, and stores the reduced draw data so as to relate the reduced draw data to the original image.

13. The input contents management server of claim 11, wherein the original image is a white image or an image indicating blank data.

14. The input contents management server of claim 10, wherein the control unit instructs each of the handwriting input devices to display an own image held by each respective handwriting input device on the display unit, to receive the handwriting input by the input surface and to transmit the own image and the draw data to the input contents management server by overlapping the own image and the draw data or by separating the draw data from the own image, and the joining unit joins the own images and the draw data received from the plurality of handwriting input devices by overlapping the own image and the draw data or by separating the draw data from the image of each handwriting input device, so as to arrange the own images and the draw data in the relative positions indicated by the relative position information.

15. The input contents management server of claim 14, wherein the control unit reduces data contents obtained by joining the own images and the draw data, to a size in which the data contents are displayed by one handwriting input device, and store the reduced data contents.

16. The input contents management server of claim 10, wherein every time when each of the handwriting input devices receives one stroke of the handwriting input, the obtaining unit obtains the draw data indicating the draw contents of the handwriting input from the handwriting input device which receives the one stroke of the handwriting input transmits, when the draw data received from one of the handwriting input devices, which includes a first updated one stroke of the handwriting input, and the draw data received from another of the handwriting input devices, which includes a second updated one stroke of the handwriting input, have a time continuity, the joining unit groups the first updated one stroke of the handwriting input and the second updated one stroke of the handwriting input into a continuous stroke, and the control unit treats the continuous stroke as a stroke to be cancelled by carrying out a return operation once.

17. The input contents management server of claim 10, wherein the arrangement information obtaining unit obtains the relative position information of each of the plurality of handwriting input devices which are adjacently arranged from each of the plurality of handwriting input devices which are adjacently arranged.

18. The input contents management server of claim 10, wherein, when a first handwriting input device is arranged adjacent to a second handwriting input device, the arrangement information obtaining unit obtains at least relative position information of the second handwriting input device with respect to the first handwriting input device and joins the draw data based on a relative position corresponding to the relative position information, the draw data being received from each of the first handwriting input device and the second handwriting input device.

19. A tangible computer-readable recording medium storing a program therein, wherein the program causes an information processing apparatus to function as an input contents management server comprising:

an obtaining unit to obtain draw data indicating draw contents of a handwriting input received by an input surface of each of a plurality of handwriting input devices which are adjacently arranged, and a respective image displayed on a display unit of each of the plurality of handwriting input devices, from each handwriting input device by overlapping the respective image and the draw data or by separating the draw data from the respective image; each handwriting input device comprising the input surface to receive the handwriting input, and the display unit in which the input surface is formed on a display surface to display the respective image;

an arrangement information obtaining unit to obtain relative position information of each of the plurality of handwriting input devices which are adjacently arranged;

a storing unit;

a joining unit to join the respective images and the draw data, based on a relative position or relative positions corresponding to the relative position information, the draw data being which are obtained from each of the plurality of handwriting input devices by overlapping the respective image and the draw data or by separating the draw data from the respective image of each of the handwriting input devices, so as to arrange the respective images and the draw data in relative positions indicated by the relative position information; and a control unit to reduce data contents obtained by joining the respective images and the draw data, to a size in which the data contents are displayed by one handwriting input device, and to store the reduced data contents in the storing unit.

20. The tangible computer-readable recording medium of claim 19, wherein the control unit transmits division images obtained by dividing an original image into the number of the handwriting input devices in accordance with the relative position information, to the handwriting input devices arranged in same relative positions as the division images of the original image, respectively, and the control unit instructs each of the handwriting input devices to display the division image received from the control unit, on the display unit, and to receive the handwriting input by the input surface.

21. The tangible computer-readable recording medium of claim 20, wherein the control unit reduces the joined draw data so as to match with a size of the original image, and stores the reduced draw data so as to relate the reduced draw data to the original image.

22. The tangible computer-readable recording medium of claim 20, wherein the original image is a white image or an image indicating blank data.

23. The tangible computer-readable recording medium of claim 19, wherein the control unit instructs each of the handwriting input devices to display an own image held by each handwriting input device on the display unit, to receive the handwriting input by the input surface and to transmit the own image and the draw data to the input contents management server by overlapping the own image and the draw data or by separating the draw data from the own image, and the joining unit joins the own images and the draw data received from the plurality of handwriting input devices by overlapping the own image and the draw data or by separating the draw data from the own image of each handwriting input device, so as to arrange the own images and the draw data in the relative positions indicated by the relative position information.

24. The tangible computer-readable recording medium of claim 23, wherein the control unit reduces data contents obtained by joining the own images and the draw data, to a size in which the data contents are displayed by one handwriting input device, and store the reduced data contents.

25. The tangible computer-readable recording medium of claim 19, wherein every time when each of the handwriting input devices receives one stroke of the handwriting input, the obtaining unit obtains the draw data indicating the draw contents of the handwriting input from the handwriting input device which receives the one stroke of the handwriting input transmits, when the draw data received from one of the handwriting input devices, which includes a first updated one stroke of the handwriting input, and the draw data received from another of the handwriting input devices, which includes a second updated one stroke of the handwriting input, have a time continuity, the joining unit groups the first updated one stroke of the handwriting input and the second updated one stroke of the handwriting input into a continuous stroke, and the control unit treats the continuous stroke as a stroke to be cancelled by carrying out a return operation once.

26. The tangible computer-readable recording medium of claim 19, wherein the arrangement information obtaining unit obtains the relative position information of each of the plurality of handwriting input devices which are adjacently arranged from each of the plurality of handwriting input devices which are adjacently arranged.

27. The tangible computer-readable recording medium of claim 19, wherein, when a first handwriting input device is arranged adjacent to a second handwriting input device, the arrangement information obtaining unit obtains at least relative position information of the second handwriting input device with respect to the first handwriting input device and joins the draw data based on a relative position corresponding to the relative position information, the draw data being received from each of the first handwriting input device and the second handwriting input device.

28. An input contents management server, comprising:
an obtaining unit to obtain draw data indicating draw contents of a handwriting input received by an input surface of each of a plurality of handwriting input devices which are adjacently arranged, and a respective image displayed on a display unit of each of the plurality of handwriting input devices, from each handwriting input device by overlapping the respective image and the draw data or by separating the draw data from the respective image;
each handwriting input device comprising the input surface to receive the handwriting input, and the display unit in which the input surface is formed on a display surface to display the respective image;
an arrangement information obtaining unit to obtain relative position information of each of the plurality of handwriting input devices which are adjacently arranged;
a storing unit; and
a joining unit to join the respective images and the draw data, based on a relative position or relative positions corresponding to the relative position information, the draw data being obtained from each of the plurality of handwriting input devices by overlapping the respective image and the draw data or by separating the draw data from the respective image of each of the handwriting input devices, so as to arrange the respective images and the draw data in relative positions indicated by the relative position information,
wherein each of the plurality of handwriting input devices further comprises a respective display device, and when the plurality of handwriting input devices are adjacently arranged, the arrangement information obtaining unit displays the joined draw data on the respective display devices of the plurality of handwriting input devices as one display.

29. A tangible computer-readable recording medium storing a program therein, wherein the program causes an information processing apparatus to function as an input contents management server comprising:
an obtaining unit to obtain draw data indicating draw contents of a handwriting input received by an input surface of each of a plurality of handwriting input devices which are adjacently arranged, and a respective image displayed on a display unit of each of the plurality of handwriting input devices, from each handwriting input device by overlapping the respective image and the draw data or by separating the draw data from the respective image; each handwriting input device comprising the input surface to receive the handwriting input, and the display unit in which the input surface is formed on a display surface to display the respective image;
an arrangement information obtaining unit to obtain relative position information of each of the plurality of handwriting input devices which are adjacently arranged;
a storing unit; and
a joining unit to join the respective images and the draw data, based on a relative position or relative positions corresponding to the relative position information, the draw data being which are obtained from each of the plurality of handwriting input devices by overlapping the respective image and the draw data or by separating the draw data from the respective image of each of the handwriting input devices, so as to arrange the respective images and the draw data in relative positions indicated by the relative position information,
wherein each of the plurality of handwriting input devices further comprises a display device, and when the plurality of handwriting input devices are adjacently arranged, the arrangement information obtaining unit displays the joined draw data on the respective display devices of the plurality of handwriting input devices as one display.

* * * * *